United States Patent
Yamada et al.

(10) Patent No.: US 7,566,861 B2
(45) Date of Patent: Jul. 28, 2009

(54) DETECTION DEVICE CONTROLLED BY DRIVING SPEED AND DRIVING DIRECTION

(75) Inventors: Masato Yamada, Inuyama (JP); Shuichi Ichiura, Hashima (JP)

(73) Assignee: Sanyo Electric Co., Ltd., Osaka (JP)

(*) Notice: Subject to any disclaimer, the term of this patent is extended or adjusted under 35 U.S.C. 154(b) by 239 days.

(21) Appl. No.: 11/410,049

(22) Filed: Apr. 25, 2006

(65) Prior Publication Data
US 2006/0244978 A1 Nov. 2, 2006

(30) Foreign Application Priority Data
Apr. 27, 2005 (JP) ............................. 2005-130248

(51) Int. Cl.
G06M 7/00 (2006.01)
B60Q 1/00 (2006.01)
B62D 1/24 (2006.01)
G01C 3/08 (2006.01)

(52) U.S. Cl. ........................ 250/221; 340/435; 180/169; 356/4.01

(58) Field of Classification Search ................ 250/221; 340/435, 436; 180/167, 169
See application file for complete search history.

(56) References Cited

U.S. PATENT DOCUMENTS

| 4,632,543 | A | * | 12/1986 | Endo ......................... 356/5.08 |
| 5,302,835 | A | * | 4/1994 | Bendett et al. ......... 250/559.09 |
| 5,461,357 | A | * | 10/1995 | Yoshioka et al. ............ 340/435 |
| 5,898,483 | A | * | 4/1999 | Flowers ..................... 356/4.01 |
| 6,122,040 | A | * | 9/2000 | Arita et al. .................. 356/4.01 |
| 2001/0012206 | A1 | * | 8/2001 | Hayami et al. .............. 362/464 |
| 2003/0234347 | A1 | * | 12/2003 | Akagi ........................ 250/221 |
| 2004/0175183 | A1 | | 9/2004 | Willhoeft et al. |
| 2004/0232317 | A1 | * | 11/2004 | Ura et al. .................... 250/221 |

FOREIGN PATENT DOCUMENTS

JP    11-325885    11/1999

* cited by examiner

*Primary Examiner*—Stephen Yam
*Assistant Examiner*—Jennifer Bennett
(74) *Attorney, Agent, or Firm*—McDermott Will & Emery LLP

(57) ABSTRACT

A detection device detects an obstacle within a target region by setting the target region, setting a scan trajectory, and setting a pattern of an irradiation position of a laser beam within the target region based on a signal related to a moving state of the detection device or a moving object on which the detection device is mounted.

1 Claim, 19 Drawing Sheets

AT NORMAL DRIVING

CENTER POSITION OF FORWARD REGION IN TRAVELING DIRECTION IS SET AS HIGH DENSITY IRRADIATION PORTION

AT DETECTION OF OBSTACLE

HIGH DENSITY IRRADIATION PORTION IS SHIFTED TO OBSTACLE DETECTION POSITION

EXAMPLE OF SCAN TRAJECTORY

SCAN OPERATION

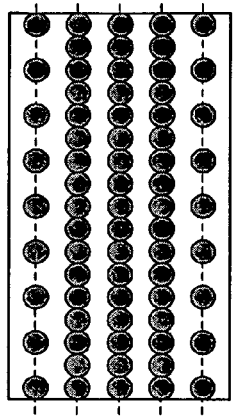

*Fig. 6C*

PATTERN EXAMPLE 3

WEIGHTING OF CENTER PORTION IN LONGITUDINAL WIDTH DIRECTION IS HIGH

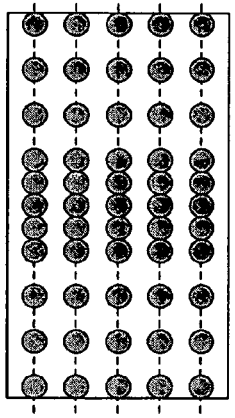

*Fig. 6B*

PATTERN EXAMPLE 2

WEIGHTING OF CENTER PORTION IN LATERAL WIDTH DIRECTION IS HIGH

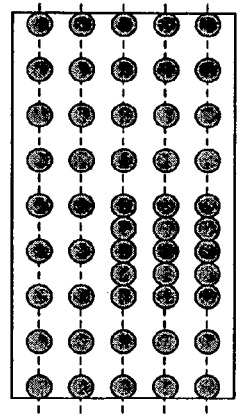

*Fig. 6E*

PATTERN EXAMPLE 5

WEIGHTING IS PARTIALLY HIGH

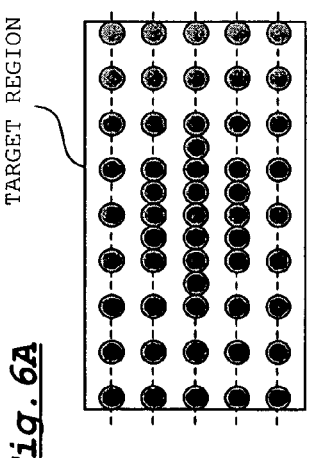

*Fig. 6A*

TARGET REGION

PATTERN EXAMPLE 1

WEIGHTING OF CENTER PORTION IS HIGH

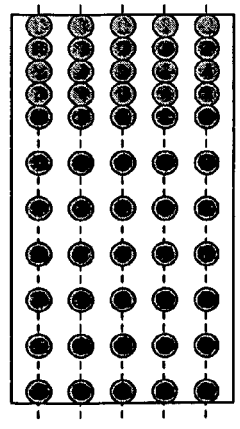

*Fig. 6D*

PATTERN EXAMPLE 4

WEIGHTING OF RIGHT SIDE PORTION IN LATERAL WIDTH DIRECTION IS HIGH

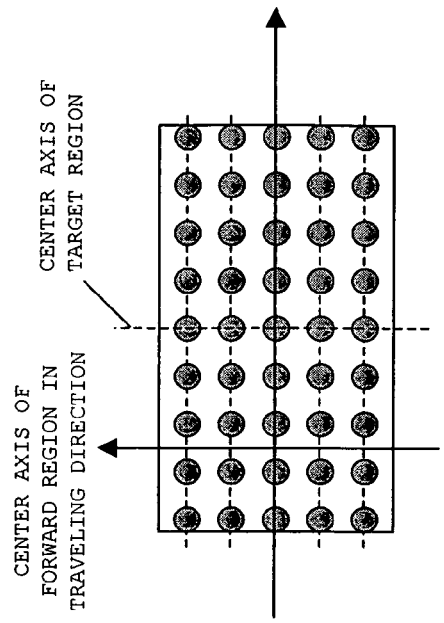

Fig. 7B

AT STEERING 1 (RIGHT TURN STEERING)

AREA ASYMMETRICAL ABOUT CENTER AXIS OF FORWARD REGION IN TRAVELING DIRECTION IS SCANNED (ANGLE BETWEEN DIRECTION TO CENTER AXIS OF SCAN REGION AND DIRECTION TO CENTER AXIS IN TRAVELING DIRECTION SIMPLY INCREASES ACCORDING TO STEERING ANGLE)

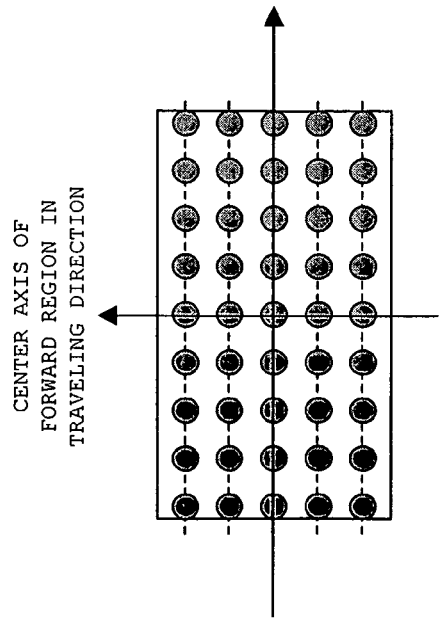

Fig. 7A

AT STRAIGHT-AHEAD DRIVING

AREA SYMMETRICAL ABOUT CENTER AXIS OF FORWARD REGION IN TRAVELING DIRECTION IS SCANNED

Fig.7C

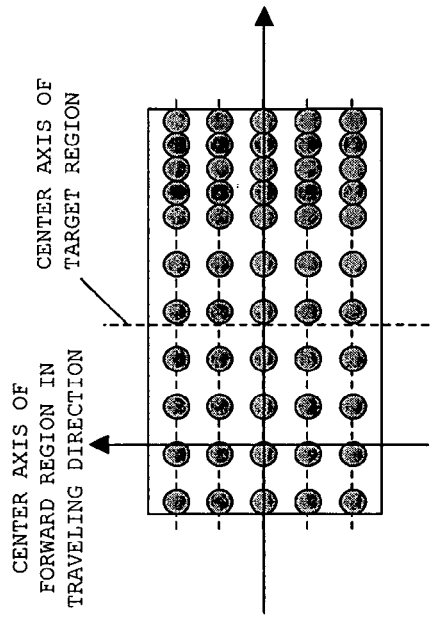

CENTER AXIS OF
FORWARD REGION IN
TRAVELING DIRECTION

AT STEERING 2 (RIGHT TURN STEERING)

AREA SYMMETRICAL ABOUT CENTER AXIS OF FORWARD REGION IN TRAVELING DIRECTION IS SCANNED USING PATTERN IN WHICH RIGHT SIDE IN LATERAL WIDTH DIRECTION IS WEIGHTED

Fig.7D

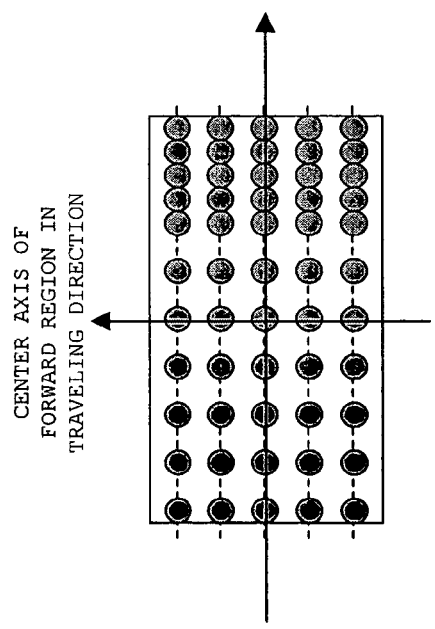

CENTER AXIS OF
FORWARD REGION IN
TRAVELING DIRECTION

CENTER AXIS OF
TARGET REGION

AT STEERING 3 (RIGHT TURN STEERING)

AREA ASYMMETRICAL ABOUT CENTER AXIS OF FORWARD REGION IN TRAVELING DIRECTION IS SCANNED USING PATTERN IN WHICH RIGHT SIDE IN LATERAL WIDTH DIRECTION IS WEIGHTED

POSITION-VOLTAGE CHARACTERISTICS

STRUCTURE OF PSD

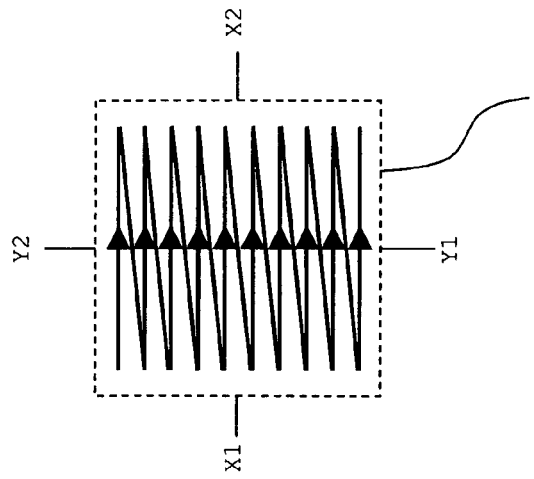
Fig. 14A
SCAN OPERATION
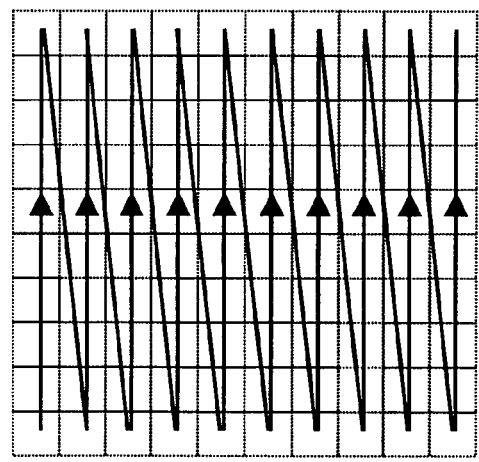
Fig. 14B
EXAMPLE OF SCAN TRAJECTORY
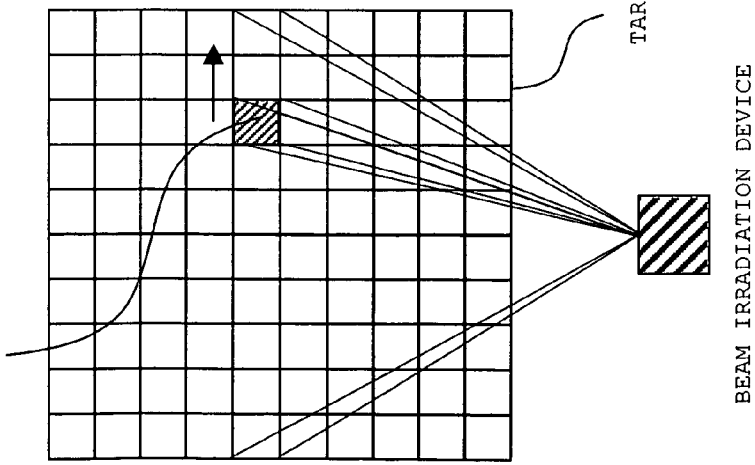
Fig. 14C
SPOT TRAJECTORY ON PSD

AT NORMAL DRIVING

CENTER POSITION OF FORWARD REGION IN TRAVELING DIRECTION IS SET AS HIGH DENSITY IRRADIATION PORTION

AT DETECTION OF OBSTACLE

HIGH DENSITY IRRADIATION PORTION IS SHIFTED TO OBSTACLE DETECTION POSITION

AT DETECTION OF OBSTACLE

HIGH DENSITY IRRADIATION PORTION IS SHIFTED TO OBSTACLE DETECTION POSITION

DETECTION DEVICE CONTROLLED BY DRIVING SPEED AND DRIVING DIRECTION

BACKGROUND OF THE INVENTION

1. Field of the Invention

The present invention relates to a detection device for detecting an obstacle within a target region by emitting a laser beam to the target region, which is suitable, for example, to be mounted on a moving object such as a vehicle or an airplane.

2. Description of the Related Art

In recent years, vehicle-to-vehicle distance detectors and distance detectors using laser beams have been employed in various devices. A vehicle-to-vehicle distance detector, for example, detects the presence or absence of an obstacle and measures a distance to the obstacle by detecting reflected beams that are obtained when laser beams are radiated from a front portion of a vehicle.

In this case, the laser beams are caused to longitudinally and laterally scan a target region preset in a front space. A time difference between timing for radiating the laser beams and timing for receiving the reflected beams is measured at each scan position, and a distance to an obstacle located in front of each scan position is calculated from a result of the measurement.

JP 11-325885 A describes a technique for detecting a deviation between a driving direction and a laser beam irradiation direction using an acceleration sensor to align the laser beam irradiation direction with the driving direction.

When the driving direction turns to, for example, the right or the left, it is particularly necessary for the detection device to detect as early as possible an obstacle located in the direction to which the driving direction is turning, in order to achieve adequate control in subsequent driving. During high-speed driving, it is necessary to detect an obstacle located at a long distance ahead in the driving direction early enough so that the detection information can be reflected on driving control. When an obstacle is detected ahead in the driving direction of the vehicle, it is particularly necessary to monitor movement of the obstacle and a state thereof in great detail.

JP 11-325885 A describes a technique for aligning the laser beam irradiation direction with the driving direction. However, JP 11-325885 A does not describe how to control a laser beam scan state to be adapted to a high-speed driving mode and an obstacle detection mode. JP 11-325885 A includes no more description than that the laser beam irradiation direction is merely adjusted so as to suppress the deviation between the laser beam irradiation direction and the driving direction when the driving direction changes.

SUMMARY OF THE INVENTION

An object of the present invention is to provide a detection device capable of detecting movement of an obstacle and a state thereof with high precision when a driving direction changes and at the time of high-speed driving by achieving adequate scan control.

A first aspect of the present invention is characterized by a detection device for detecting an obstacle within a target region by emitting a laser beam to the target region, including: target region setting means for setting the target region; scan trajectory setting means for setting a scan trajectory of the laser beam within the target region; and irradiation pattern setting means for setting a pattern of an irradiation position of the laser beam within the target region based on a signal related to a moving state of the detection device or a moving object on which the detection device is mounted.

In the detection device according to the first aspect of the present invention, the irradiation pattern of an irradiation position of the laser beam within the target region is set based on a signal related to a moving state of the detection device or a moving object on which the detection device is mounted. Therefore, the obstacle can be detected with high precision and smoothly according to the moving state of the detection device or a moving object on which the detection device is mounted.

In the first aspect of the present invention, the irradiation pattern setting means may set the pattern based on at least one of a signal related to a traveling direction of the moving object and a signal related to a traveling speed thereof.

For example, in the first aspect of the present invention, the irradiation pattern setting means may set, as the pattern of the irradiation position of the laser beam within the target region, a pattern for increasing irradiation frequency on a portion shifted in a direction to which the traveling direction is changed from a center of the target region, based on the signal related to the traveling direction of the detection device or the moving object on which the detection device is mounted.

In this case, the target region setting means shifts the target region in the direction to which the traveling direction is changed from a center axis in the traveling direction, based on the signal related to the traveling direction of the detection device or the moving object on which the detection device is mounted.

When the irradiation pattern of the laser beam and the target region are set according to a change of traveling direction of the detection device or the moving object on which the detection device is mounted like the above, the detection of an obstacle at the time of a traveling direction change can be performed more appropriately.

Also, in the first aspect of the present invention, the irradiation pattern setting means may set, as the pattern of the irradiation position of the laser beam within the target region, a pattern for increasing irradiation frequency on a center portion of a forward region in the traveling direction, based on the signal related to the traveling speed of the detection device or the moving object on which the detection device is mounted.

In this case, the target region setting means may reduce the target region toward the center portion of the forward region in the traveling direction, based on the signal related to the traveling speed of the detection device or the moving object on which the detection device is mounted. To be more specific, the target region setting means may reduce the target region toward the center portion of the forward region in the traveling direction with an increase of the traveling speed, based on the signal related to the traveling speed of the moving object.

When the irradiation pattern of the laser beam and the target region are set according to a speed of the detection device or the moving object on which the detection device is mounted like the above, the detection of an obstacle at the time of a high-speed traveling can be performed more appropriately.

Also, a detection device according to the first aspect of the present invention may further include: separation means for separating a part of the laser beam irradiated to the target region; detection means for receiving the laser beam separated by the separation means and detecting a beam receiving position of the separated beam on a beam receiving face; and correction means for correcting a scan position of the laser beam irradiated to the target region based on the beam receiving position detected by the detection means.

According to this, since the irradiation position of laser beams in the target region and the beam receiving position of separated beams on the beam receiving face correspond to each other on one-to-one basis, the irradiation position of the laser beams can be monitored referring to the beam receiving position of the separated beams. Thus, the scan trajectory of the laser beam within the target region can be made to follow the desired scan trajectory by correcting the scan position of the laser beam based on a detection result of the detection means. Therefore, the detection of an obstacle can be performed more smoothly.

A second aspect of the present invention is characterized by a detection device for detecting an obstacle within a target region by emitting a laser beam to the target region, including: a beam source for emitting a laser beam; an actuator for changing an irradiation direction of the laser beam; a target region setting circuit for setting the target region by controlling the actuator; a scan trajectory setting circuit for setting a scan trajectory of the laser beam within the target region by controlling the actuator; and an irradiation pattern setting circuit for setting a pattern of an irradiation position of the laser beam within the target region based on a signal related to a moving state of the detection device or a moving object on which the detection device is mounted and for controlling irradiation timing of the laser beam within the target region based on the pattern set.

A detection device according to the second aspect of the present invention may further include, same as the first aspect of the present invention, a configuration to make the scan trajectory of the laser beam within the target region to follow the desired scan trajectory by monitoring the scan position of the laser beam. In this case, the detection devise may include: an optical element for separating a part of the laser beam irradiated to the target region; a photo detector for receiving the laser beam separated by the optical element and outputting a signal according to a beam receiving position of the separated beam on a beam receiving face; a detection circuit for detecting the beam receiving position of the separated beam on the beam receiving face based on the signal from the photo detector; and a correction circuit for correcting a scan position of the laser beam irradiated to the target region based on the beam receiving position detected by the detection circuit.

Note that, in each aspect of the present invention above, a signal related to a moving state of a detection device is synonymous with a signal related to a moving state of a moving object because the detection device is mounted on the moving object. The present invention extends to both a detection device itself and a moving object on which the detection device is mounted.

A detection device according to each aspect of the present invention above is shown as a beam irradiation device in a following embodiment of the present invention.

A group of a scan control portion 10a, a DAC 20, an actuator driving circuit 40 and a lens actuator 300 in the following embodiment corresponds to "target region setting means" in the first aspect of the present invention above.

A group of a scan control portion 10a (including a scan table), a DAC 20, an actuator driving circuit 40 and a lens actuator 300 in the following embodiment corresponds to "scan trajectory setting means" in the first aspect of the present invention above. A group of a scan control portion 10a (including a table for prescribing a irradiation pattern), a DAC 20, a laser driving circuit 30 and a semiconductor laser 100 in the following embodiment corresponds to "irradiation pattern setting means" in the first aspect of the present invention above.

A group of a scan control portion 10a, a DAC 20 and an actuator driving circuit 40 in the following embodiment corresponds to "target region setting circuit" in the second aspect of the present invention above. A group of a scan control portion 10a (including a scan table), a DAC 20 and an actuator driving circuit 40 in the following embodiment corresponds to "scan trajectory setting circuit" in the second aspect of the present invention above. A group of a scan control portion 10a (including a table for prescribing a irradiation pattern), a DAC 20 and a laser driving circuit 30 in the following embodiment corresponds to "irradiation pattern setting circuit" in the second aspect of the present invention above.

It should be noted, however, that the following embodiment is one example of an embodiment form of this invention and meanings of terms of the invention and components are not limited to the embodiment.

BRIEF DESCRIPTION OF THE DRAWINGS

The above-mentioned and other objects of the present invention and the novel features thereof will be completely more clear when the following descriptions of embodiments are read with reference to the accompanying drawings.

FIGS. 6A to 6E show examples of an irradiation pattern according to the first embodiment of the present invention;

FIGS. 7A to 7D show examples of an irradiation pattern when a traveling direction changes according to the first embodiment of the present invention;

FIGS. 14A to 14C are explanatory views showing scan operation according to the second embodiment of the present invention;

DETAILED DESCRIPTION OF THE PREFERRED EMBODIMENT

Embodiments of the present invention will be described hereinafter with reference to the drawings.

First Embodiment

Figure 1:
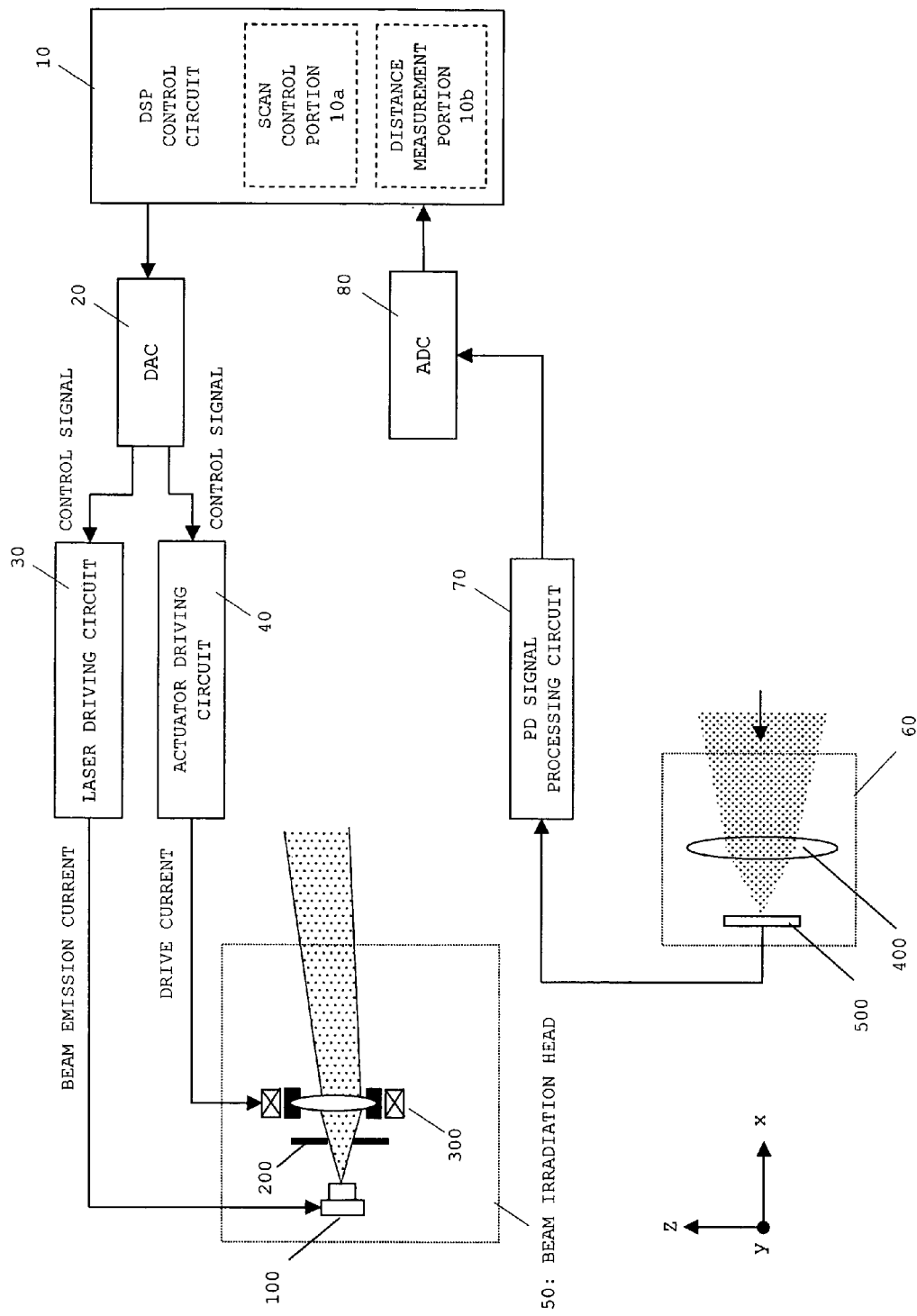
FIG. 1 shows a configuration of a beam irradiation device according to a first embodiment of the present invention.

FIG. 1 shows the configuration of a beam irradiation device according to a first embodiment of the present invention.

A beam irradiation device is provided with a digital signal processor (DSP) control circuit 10, a digital analog converter (DAC) 20, a laser driving circuit 30, an actuator driving circuit 40, a beam irradiation head 50, a beam receiving portion 60, a photo detector (PD) signal processing circuit 70 and an analog digital converter (ADC) 80.

The DSP control circuit 10 outputs a digital signal for performing drive control of the laser driving circuit 30 and the actuator driving circuit 40 to the DAC 20. Also, The DSP control circuit 10 detects the position of an obstacle in a scanning region and measures a distance to the obstacle based on the digital signal input from ADC 80. A scan control portion 10a and a distance measurement portion 10b are provided in the DSP control circuit 10.

Signals relating to the steering direction and speed of the vehicle are inputted to the scan control portion 10a as external signals. Also, signals relating to the position of the obstacle and the distance to the obstacle detected by the distance measurement portion 10b are inputted to the scan control portion 10a. Based on these signals, the scan control portion 10a changes the scan pattern and the scanning region. The scan control processing executed by the scan control portion 10a will be described later in detail.

High-frequency internal clock signals (not shown in FIG. 1) are inputted to the distance measurement portion 10b. The distance measurement portion 10b counts the number of clocks for the term between the timing of irradiation of pulse beam irradiated at each scan position and the timing of reception of the reflected pulse beam. Based on the number of clocks (clock number N), the distance measurement portion 10b detects the presence or absence of the obstacle at the scan position and the distance to the obstacle (distance L). For example, using a period of the internal clocks (T), the distance measurement portion 10b obtains the distance to the obstacle by calculating $L=C \times T \times N/2$ (C is the velocity of light). When the reflected pulse beam is not received in predetermined term, the distance measurement portion 10b judges that there is no obstacle at the scan position.

The DAC 20 converts the digital signal inputted from the DSP control circuit 10 into analog signals (control signals) and outputs the converted analog signals to the laser driving circuit 30 and the actuator driving circuit 40, respectively. The laser driving circuit 30 drives a semiconductor laser 100 in the beam irradiation head 50 in accordance with the control signal inputted from the DAC 20. The actuator driving circuit 40 drives a lens actuator 300 in the beam irradiation head 50 in accordance with the control signal inputted from the DAC 20.

The beam irradiation head 50 irradiates laser beams with a target region set in a space in front of the beam irradiation device while performing a scan. As shown in FIG. 1, the beam irradiation head 50 is provided with the semiconductor laser 100, an aperture 200 and the lens actuator 300.

Laser beams emitted from the semiconductor laser 100 are shaped into a desired shape by the aperture 200 and then allowed to impinge on an irradiation lens supported by the lens actuator 300. The irradiation lens is supported by the lens actuator 300 so as to be displaceable in the direction of a y-z plane of FIG. 1 namely in parallel with the surface of the target region. Therefore, the laser beams that have passed through the irradiation lens change in outgoing angle in the direction of the y-z plane as the lens actuator 300 is driven. Thus, a laser beam scan on the target region is performed.

Disposed in the DSP control circuit 10 are a table (scan table) for setting scan trajectories of laser beams within the target region and a table (irradiation pattern) for setting irradiation positions (positions of laser beam emission) within the target region.

The scan control portion 10a of the DSP control circuit 10 control circuit outputs a signal for controlling the actuator driving circuit 40 to the DAC 20 while referring to the scan table. The signal is input to the actuator driving circuit 40 thorough the DAC 20. The actuator driving circuit 40 drives the lens actuator 300 such that the laser beams perform a scan in such a manner as to follow the trajectory prescribed in the scan table. Due to this servo operation, the laser beams perform a scan within the target region in such a manner as to follow the trajectory prescribed in the scan table.

Furthermore, the scan control portion 10a of the DSP control circuit 10 outputs a signal for controlling the laser driving circuit 30 while referring to the irradiation pattern. The signal is input to the laser driving circuit 30 thorough the DAC 20. The laser driving circuit 30 drives the semiconductor laser 100 such that the laser beams are emitted in pulse shape (a rectangle) at the position prescribed by the irradiation pattern (table) on the trajectory prescribed in the scan table. Here, "pulse shape" means that output of the semiconductor laser 100 is made a high level from zero level during a fixed period of time. In this way, the laser beams are emitted at the position prescribed by the irradiation pattern (table) on the trajectory prescribed in the scan table.

The beam receiving portion 60 receives the laser beams reflected by an obstacle or the like. The beam receiving portion 60 is provided with a converging lens 400 and a photo detector (PD).

The laser beam reflected by the obstacle or the like is converged on the PD 500 through the converging lens 400. The PD 500 has a beam receiving face perpendicular to the X-Y plane of FIG. 1. The PD 500 outputs an electrical signal according to the amount of light income in the beam receiving face. A conventional type photo detector can be used as the PD 500.

The electrical signal from the PD 500 is input in the PD signal processing circuit 70. The PD signal processing circuit 70 amplifies and cancels noise from the electrical signal inputted from the PD 500 and outputs the produced electrical signal to the ADC 80.

The ADC 80 converts the electrical signal inputted from the PD signal processing circuit 70 into a digital signal and outputs the converted digital signal to the distance measurement portion 10b of the DSP processing circuit. The distance measurement portion 10b of the DSP processing circuit detects timing for receiving the reflected beams based on the digital signal inputted from the ADC 90. The distance measurement portion 10*b* further detects the distance to the obstacle at the scan position based on the timing for receiving the reflected beam and timing for emitting the laser beam inputted from the scan control portion 10*a* and outputs the detected distance to the scan control portion 10*a*.

Figure 2:
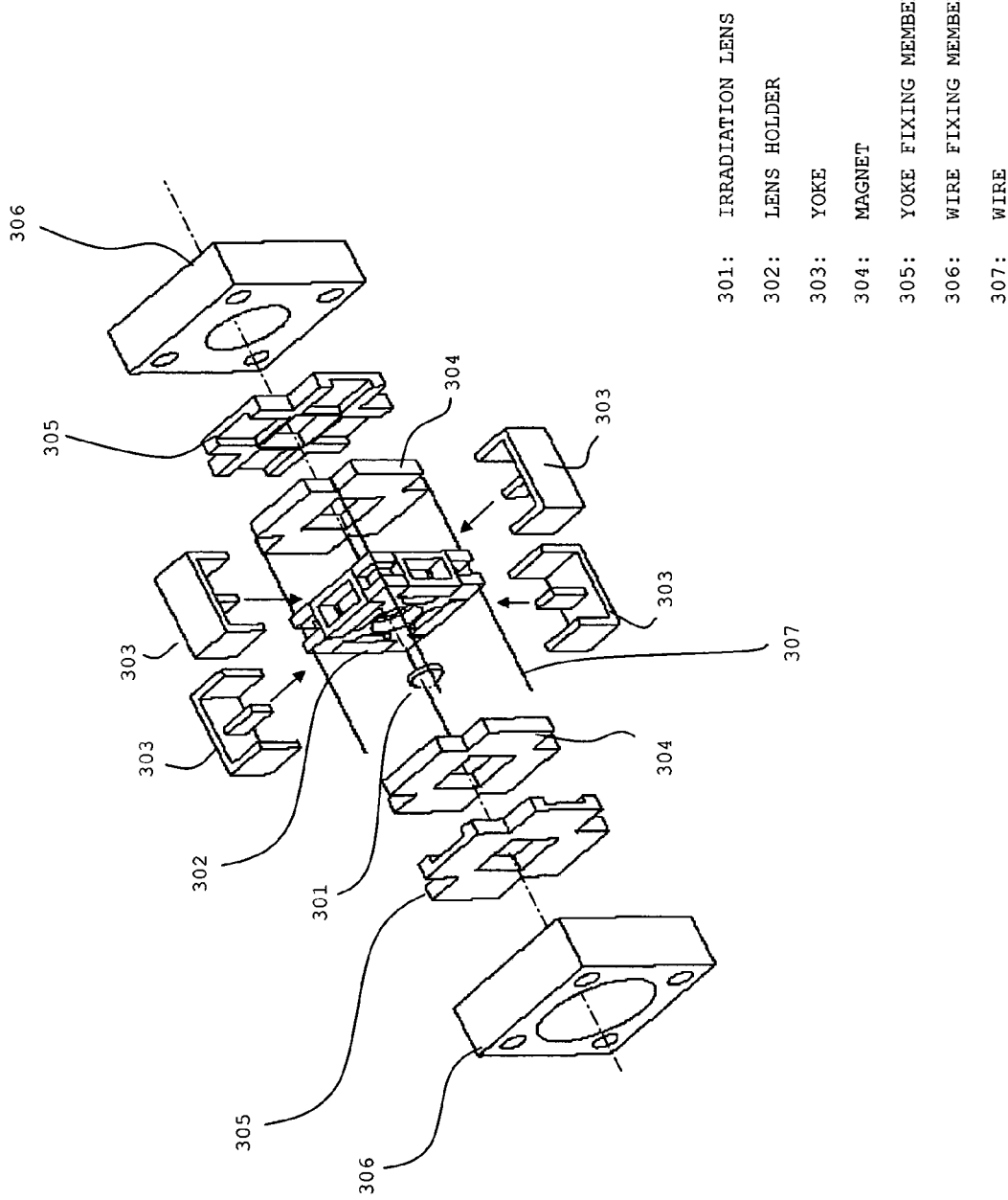
FIG. 2 shows a construction of a beam irradiation head according to the first embodiment of the present invention.
Figure 3:
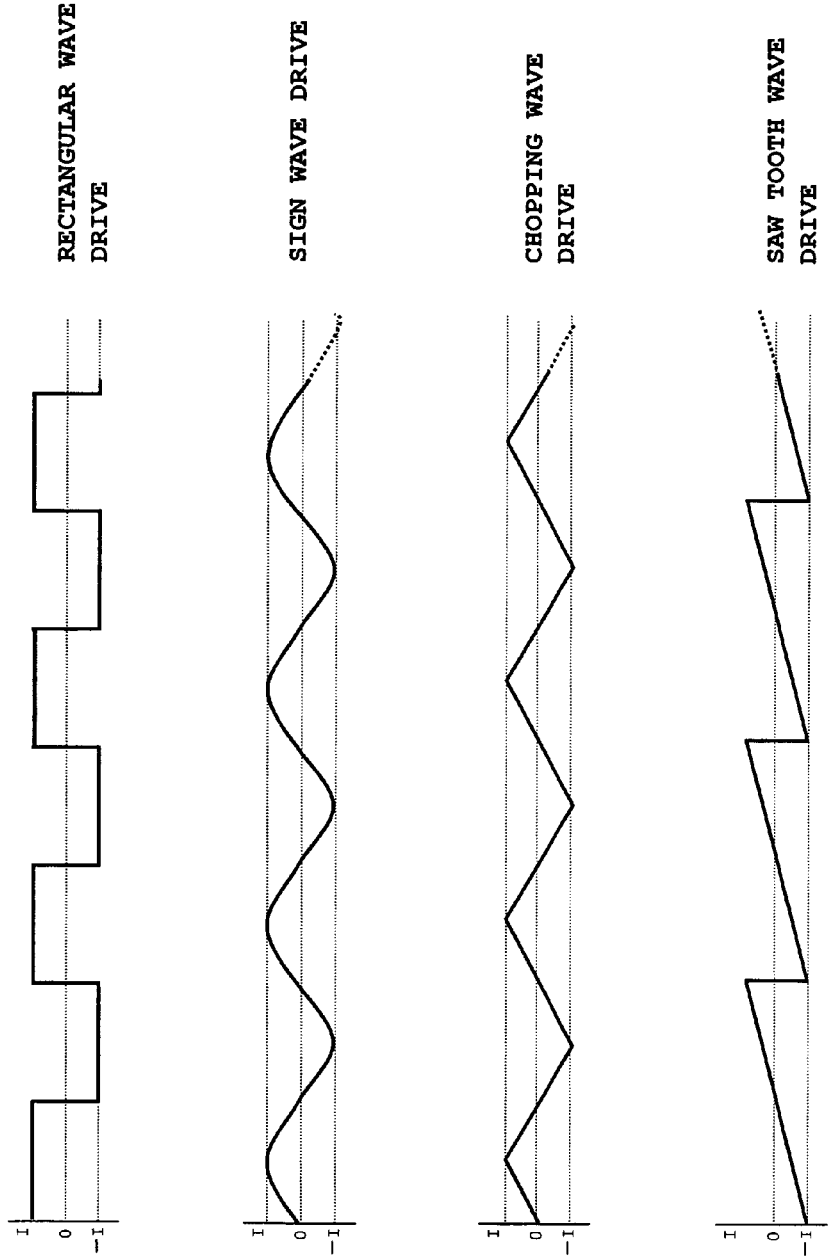
FIG. 3 shows an example of VCM driving electric current according to the first embodiment of the present invention.

FIG. 2 shows the construction of the lens actuator 300 (an exploded perspective view).

Referring to FIG. 2, an irradiation lens 301 is fitted in a central opening of a lens holder 302. Coils are fitted on four lateral faces of the lens holder 302, respectively. Central protruding portions of yokes 303 are inserted into the coils respectively as indicated by arrows shown in FIG. 2. Tongue strips of each of the yokes 303 on both sides are fittingly inserted into corresponding depressed portions of a pair of yoke fixing members 305. In addition, magnets 304 are secured to the yoke fixing members 305 respectively such that the tongue strips of the yokes 303 are sandwiched therebetween. In this state, the yoke fixing members 305 accompanied with the magnets 304 are mounted on a base (not shown).

Moreover, a pair of wire fixing members 306 is mounted on the base. The lens holder 302 is resiliently supported by the wire fixing member 306 via wires 307. Holes for fittingly inserting the wires 307 therethrough are formed through the lens holder 302 at its four corners. After the wires 307 have been fittingly inserted through the holes, respectively, both ends of each of the wires 307 are secured to the wire fixing members 306, respectively. Thus, the lens holder 302 is resiliently supported by the wire fixing members 306 via the wires 307.

At the time of driving, drive signals are supplied from the actuator driving circuit 40 to the respective coils fitted to the lens holder 302. Thus, an electromagnetic driving force is generated, so the irradiation lens 301 is two-dimensionally driven together with the lens holder 302.

A driving signal (VCM driving electrical current) which is output from the actuator driving circuit 40 above when the irradiation lens 301 is driven in a horizontal direction (the y direction of FIG. 1) can be a rectangular wave signal, a sign wave signal, a saw tooth wave signal, a chopping wave signal or the like.

When the driving signal is the rectangular wave signal, for example, the driving direction of the irradiation lens in the horizontal direction reverses according to the driving signal being replaced by +I from −I or by −I from +I. In this case, a drive pattern of actuator 300 becomes simple, and a movement stroke of laser beam in the horizontal direction can be adjusted by regulating width of pulse.

When the driving signal is the sign wave signal, the irradiation lens 301 is displaced in the first horizontal direction in the period when the drive signal goes to +I from −I and is displaced in the second horizontal direction opposite to the first horizontal direction in the period when the drive signal goes to −I from +I. In this case, followup ability of actuator 300 for the driving signal become well, and a movement stroke of laser beam in the horizontal direction can be adjusted by regulating width of pulse.

Likewise, when the driving signal is the saw tooth wave signal or the chopping signal, the movement stroke of laser beam in the horizontal direction can be adjusted by regulating a period of these waves.

Figure 4B:
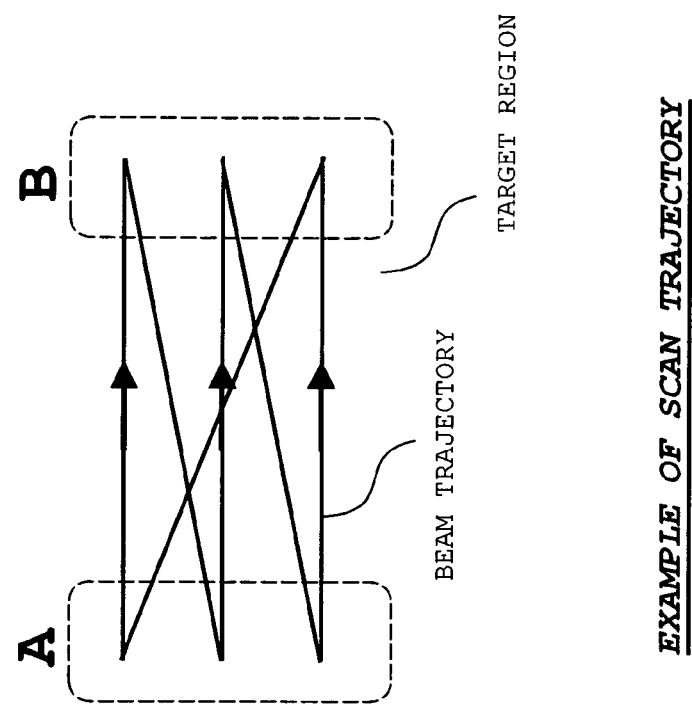
FIGS. 4A and 4B are explanatory views showing scan operation according to the first embodiment of the present invention.

A scan operation in this embodiment will be described with reference to FIGS. 4A and 4B.

Figure 4A:
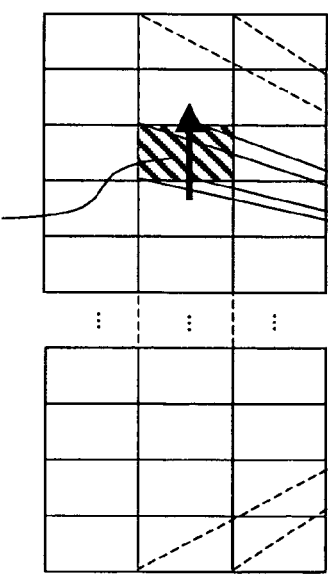

As shown in FIG. 4A, radiated laser beams are scanned so as to sequentially irradiate blocks (200 rows×3 lines) into which the target region set in the space in front of the beam irradiation device is divided. The sequence in which the blocks are scanned can be set arbitrarily. For example, as shown in FIG. 4B, a setting can also be made such that the blocks are sequentially scanned line by line starting from the one at the upper-left corner position.

As described above, a scan trajectory (scan sequence for the blocks) is prescribed in the scan table of the DSP control circuit 10. Also, the laser beams are irradiated at the position prescribed by the irradiation pattern (table) on this scan trajectory. The irradiation pattern will be described in detail with referring to FIGS. 6 to 17.

Figure 5:
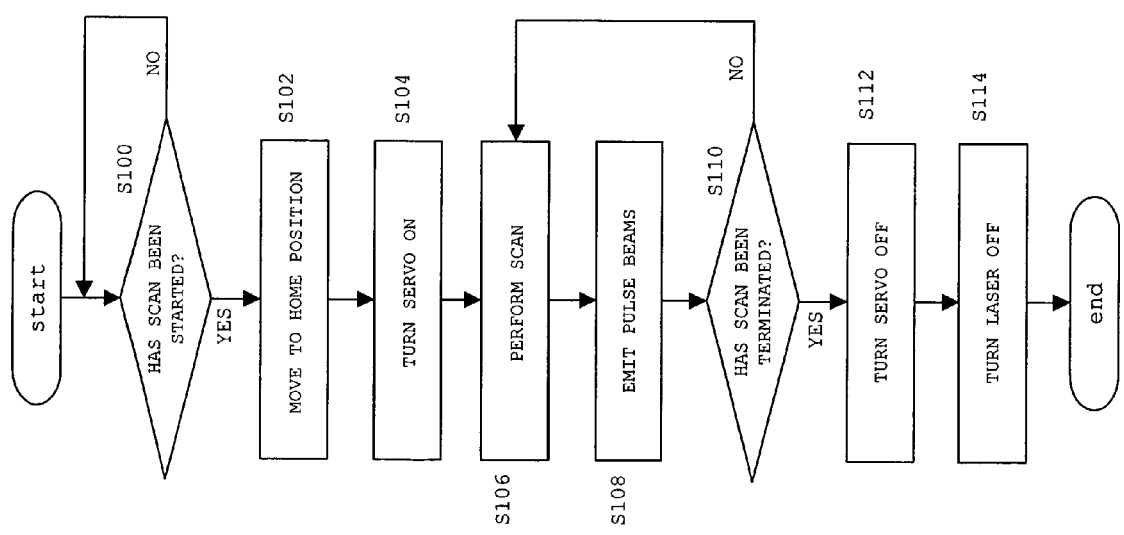
FIG. 5 is a flowchart for the scan operation according to the first embodiment of the present invention.

FIG. 5 shows a flowchart in performing the scan operation.

When the scan operation is started in S100, the irradiation position of radiated laser beams is shifted to a home position in S102. The home position is set to, for example, a position of a leftmost and uppermost one of the blocks shown in FIG. 4B. Furthermore, after a trajectory servo for the radiated laser beams has been turned ON in S104, the scan is performed in S106. Then, the radiated laser beams are irradiated for the target region in S108. At this moment, the DSP control circuit 10 in the beam irradiation device performs processing of measuring an obstacle, measuring a distance, etc. by receiving beams reflected from the target region.

After that, it is determined in S110 whether or not the scan operation has been terminated. When the scan operation has not been terminated, a processing returns to S106 to repeat the aforementioned scan operation. On the other hand, when the scan operation has been terminated, the trajectory servo is turned OFF in S112 and then the semiconductor laser 100 is turned OFF in S114.

Next, setting of a irradiation pattern and a target region will be described.

FIGS. 6A to 6E show irradiation pattern variations that can be set by the scan control portion 10*a*. It should be noted that irradiation position for laser beams in the target region is shown schematically by a circle in FIGS. 6A to 6E. A dashed line in FIGS. 6A to 6E shows a scan trajectory in horizontal direction. In the example of FIGS. 6A to 6E, the number of scan trajectories of the horizontal direction is 5. The laser beam, for example, is scanned from the left to the right along uppermost line. Next, the laser beam is scanned from the left to the right along the second line from the top. Likewise, the laser beam is scanned along each line from the left to the right while moving to the next line sequentially.

As described above, these irradiation patterns shown in FIGS. 6A to 6E are held in the DSP control circuit 10 as the table for setting the irradiation position (emitting position) of laser beams on the scan trajectory when the laser beams are scanned within the target region according to the scan table.

FIG. 6A shows an irradiation pattern in the case where irradiation frequency of a center portion of the target region is improved. This irradiation pattern is preferably used at the time of high-speed driving. This is because it is necessary to instantaneously detect an obstacle located at a distance on a driving path of the vehicle at the time of high-speed driving. When this irradiation frequency of the center portion of the target region is improved as shown in FIG. 6A, a detection trial frequency on a position corresponding to a distant position straight-ahead the vehicle increases. Therefore, the obstacle located at the distant position straight-ahead the vehicle can be smoothly detected.

FIG. 6B shows an irradiation pattern in the case where irradiation frequency of a center portion in a lateral width direction is improved. This irradiation pattern is preferably used at the time of high-speed driving as in the case shown in FIG. 10A. When this irradiation pattern is used, the detection trial frequency on the position corresponding to the distant position straight-ahead the vehicle also increases. Therefore, the obstacle located at the distant position straight-ahead the vehicle can be smoothly detected.

FIG. 6C shows an irradiation pattern in the case where irradiation frequency of a center portion in a longitudinal width direction is improved. This irradiation pattern is preferably used at the time of high-speed driving as in the case of each of the above-mentioned patterns. When this irradiation pattern is used, the detection trial frequency on the position corresponding to the distant position straight-ahead the vehicle also increases, so that the obstacle located at the distant position straight-ahead the vehicle can be smoothly detected. When the case of this irradiation pattern is compared with the case shown in FIG. 6B, a region in which the detection trial frequency is large is extended in a lateral direction. Therefore, a region capable of improving the detection precision of the obstacle can be extended in a lateral direction. Thus, it is possible to detect an obstacle which may suddenly run into a traveling path.

FIG. 6D shows an irradiation pattern in the case where irradiation frequency of a right side portion in the lateral width direction is improved. This irradiation pattern is preferably used at the time of right turn driving. This is because it is necessary to instantaneously detect whether or not an obstacle exists in a right side region to which a vehicle will turn at the time of right turn driving. When the irradiation frequency of the right side region is improved as shown in FIG. 6D, the detection trial frequency on the right side region increases, so that the obstacle located at a right side position in a traveling direction can be smoothly detected. When irradiation frequency of a left side portion in the lateral width direction is to be improved, an irradiation pattern is obtained by laterally symmetrically folding back the irradiation pattern shown in FIG. 6D. In this case, the irradiation frequency on a left side region increases, so that an obstacle located at a left side position in the traveling direction can be smoothly detected.

FIG. 6E shows an irradiation pattern in the case where irradiation frequency of a point (target position) within the target region is improved. This irradiation pattern is preferably used at the time of detection of the obstacle. This is because, when an obstacle detection position is set as the target position, the irradiation frequency in the vicinity of the obstacle position increases, so that, for example, a variation in position of the obstacle can be smoothly detected. The scan pattern shown in FIG. 6E can be obtained by executing calculation processing for changing a high-density irradiation area (center portion of the target region in FIG. 6A) of the irradiation pattern shown in FIG. 6A to the target position. In this case, the irradiation pattern shown in FIG. 6A is held in the DSP control circuit 10. The scan control portion 10a executes calculation processing for changing the high-density irradiation area on the held irradiation pattern.

FIGS. 7A to 7D show modified examples of the target region and the irradiation pattern at the time of right turn driving.

An irradiation pattern shown in FIG. 7A is set at the time of straight-path driving. When a driver turns the steering wheel to the right side in this state and then a signal related to right turn steering is inputted to the scan control portion 10a, the target region is shifted or the irradiation pattern is changed as shown in FIGS. 7B, 7C, and 7D.

FIG. 7B shows an example in which the target region is shifted to the right side relative to a center axis of a forward region in the traveling direction. In this case, an area (area shifted to the right side) asymmetrical about the center axis of the forward region in the traveling direction is scanned. Therefore, it is possible to instantaneously detect whether or not an obstacle exists in a right side region to which the vehicle will turn. At this time, the irradiation pattern shown in FIG. 7A is held in the DSP control circuit 10. The scan control portion 10a executes processing for changing the target region on the held irradiation pattern based on the steering direction and the steering angle. In this case, an angle between a direction toward the center axis of the target region from the vehicle and a direction toward the center axis of the forward region in the traveling direction from the vehicle is set so as to simply increase according to the steering angle, for example.

FIG. 7C shows an example in which the target region is not shifted and the irradiation pattern is changed to a pattern for improving irradiation frequency of the right side region. In this case, it is also possible to instantaneously detect whether or not the obstacle exists in a right-turn direction. An area symmetrical about the center axis of the forward region in the traveling direction is scanned, so the obstacle located in the forward region in the traveling direction can be also detected unlike the case shown in FIG. 7A. In this case, the irradiation pattern shown in FIG. 7A and the irradiation pattern shown in FIG. 7C are held in the DSP control circuit 10. The scan control portion 10a executes processing for selecting an irradiation pattern corresponding to the steering direction from the held irradiation patterns and setting the selected irradiation pattern.

FIG. 7D shows an example in which the target region is shifted to the right side and the irradiation pattern is changed to a pattern for improving the irradiation frequency of the right side region. In this case, it is possible to more instantaneously detect whether or not the obstacle exists in the right-turn direction as compared with the cases shown in FIGS. 7B and 7C. At this time, the irradiation pattern shown in FIG. 7A and the irradiation pattern shown in FIG. 7C are held in the DSP control circuit 10. The scan control portion 10a executes processing for selecting an irradiation pattern corresponding to the steering direction from the held irradiation patterns and setting the selected scan pattern. In addition, the scan control portion 10a executes processing for changing the target region based on the steering direction and the steering angle.

In the case of left turn steering, unlike the examples shown in FIGS. 7B to 7D, the target region is shifted to the left side or the irradiation pattern is changed to a pattern in which irradiation frequency of the left side region is improved.

Figure 8A:
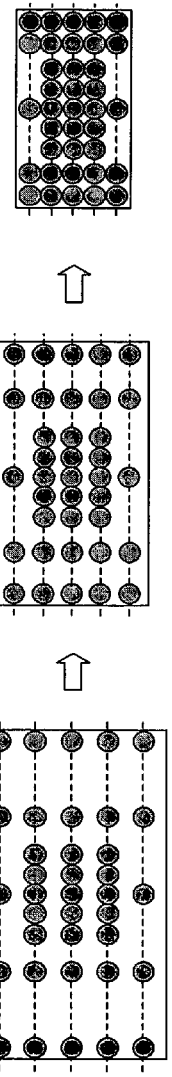
FIGS. 8A to 8C show examples of an irradiation pattern when a traveling speed changes according to the first embodiment of the present invention.
Figure 8B:
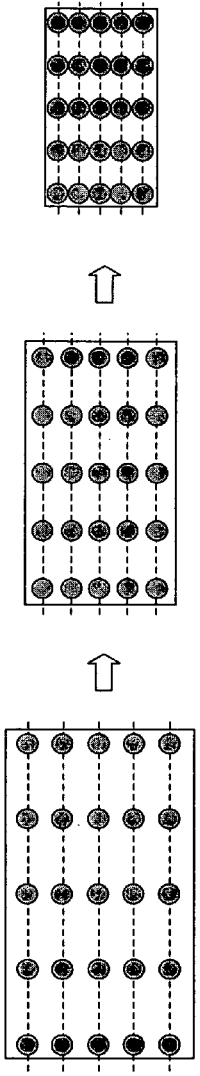
Figure 8C:
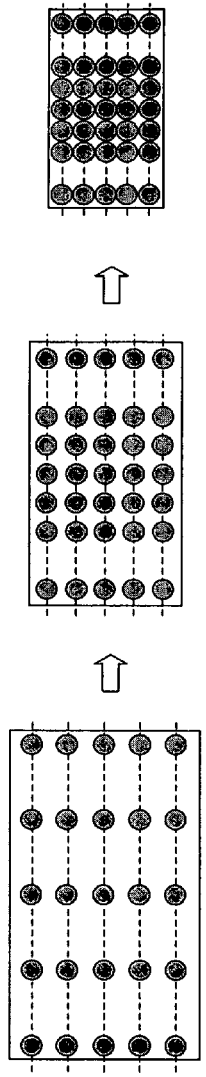

FIGS. 8A to 8C show modified examples of the target region and the irradiation pattern in the case where a driving speed increases.

In FIGS. 8A to 8C, Speed 1 corresponds to a driving speed equal to or smaller than a first threshold speed, Speed 2 corresponds to the driving speed larger than the first threshold speed and equal to or smaller than a second threshold speed, and Speed 3 corresponds to the driving speed larger than the second threshold speed. In such cases, the scan control portion 10a monitors a signal related to the driving speed as an external signal and suitably changes the target region and the irradiation pattern based on the monitored driving speed.

In the examples shown in FIGS. 8A and 8B, the target region is gradually reduced with an increase in driving speed. Therefore, the detection trial frequency on the position corresponding to the distant position straight-ahead the vehicle increases, with the result that the obstacle located at the distant position straight-ahead the vehicle can be smoothly detected. In this case, the scan pattern applied in the case of Speed 1 is held in the DSP control circuit 10. The scan control portion 10a executes processing for changing the target region based on the driving speed.

In the example shown in FIG. 8C, with an increase in driving speed, the irradiation pattern is changed to a pattern in which irradiation frequency of the center portion is improved and the target region is reduced. In this example, the detection trial frequency on the position corresponding to the distant position straight-ahead the vehicle also increases, so that the obstacle located at the distant position straight-ahead the vehicle can be smoothly detected. In this case, the irradiation pattern applied in the case of Speed 1 and the irradiation pattern applied in the case of Speed 2 are held in the DSP control circuit 10. The scan control portion 10a executes processing for selecting and setting the irradiation pattern based on a current driving speed and processing for changing the target region based on the current driving speed.

Figure 9:
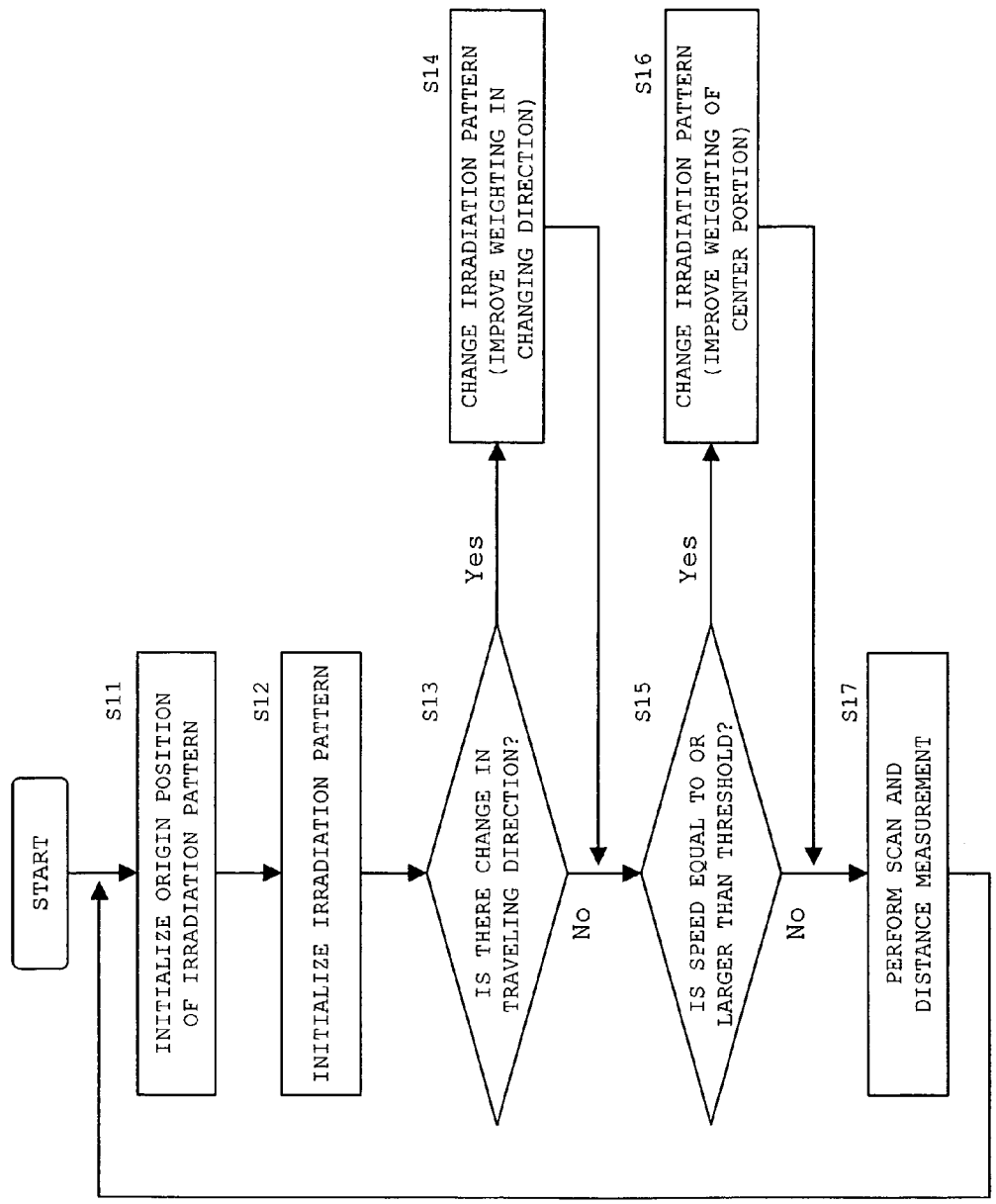
FIG. 9 is a flowchart showing a flow of irradiation pattern changing processing when the traveling direction and the traveling speed change according to the first embodiment of the present invention.

FIG. 9 is a processing flowchart for the case where the irradiation pattern is changed based on variations in steering direction and driving speed.

When the scan operation starts, the origin position of the irradiation pattern is set as the center position of the target region (Step S1). In addition, an irradiation pattern to be applied for the normal driving is set as a pattern for the irradiation operation (Step S12). Then, whether or not there is a change in the traveling direction (right turn steering or left turn steering) is determined based on successively input external signals (Step S13). When there is a change in the traveling direction (Step S13: Yes), an initialized irradiation pattern is changed to a scan pattern for improving irradiation frequency in a direction in which there is the change (for example, shown in any one of FIGS. 7B to 7D) (Step S14). When there is no change in the traveling direction (Step S13: No), the initialized scan pattern is not changed.

After the scan pattern is set as described above, whether or not a current driving speed exceeds a predetermined threshold is determined based on an external signal related to the inputted current driving speed (Step S15). When the current driving speed exceeds the predetermined threshold (Step S15: Yes), the target region is made smaller than a normal target region based on the driving speed to improve the irradiation frequency of the center portion in the driving direction (Step S16). When the current driving speed does not exceed the predetermined threshold (Step S15: No), the normal target region is set as the target region for the scan operation.

After that, when the irradiation pattern and the target region are set, the irradiation pattern is fit to the target region to set the scan trajectory for the scan operation. Then, the laser beams are irradiated at the position prescribed by the irradiation pattern on the scan trajectory. Obstacle detection processing and distance measurement processing to the obstacle are performed at each scan position based on a state of reflection beams during the scan (Step S17).

When the first scan operation is completed, processing returns to Step S11 and the same processing is repeated. Obstacle detection processing and distance measurement processing to the obstacle are performed for each scan and results obtained by processing are outputted to, for example, a control circuit for controlling the driving state of the vehicle.

In Step S16, another irradiation pattern may be set instead of reduction in target region. For example, when it is determined that there is no change in the traveling direction in Step S13, the scan pattern initialized in Step S12 may be changed to the scan pattern suitable for high-speed driving in Step S16. Alternatively, the irradiation pattern which is set in Step S13 and suitable for left or right turn, for example, the scan pattern shown in FIG. 7C may be changed to the irradiation pattern suitable for both the high-speed driving and the left or right turn, for example, a irradiation pattern in which irradiation frequencies on the center portion in the traveling direction and a side portion in the steering direction within the target region increase.

In Step S14, for example, as shown in FIGS. 7B and 7D, the target region may be shifted in the steering direction, instead of changing of the irradiation pattern or in addition to changing of the irradiation pattern.

Figure 15:
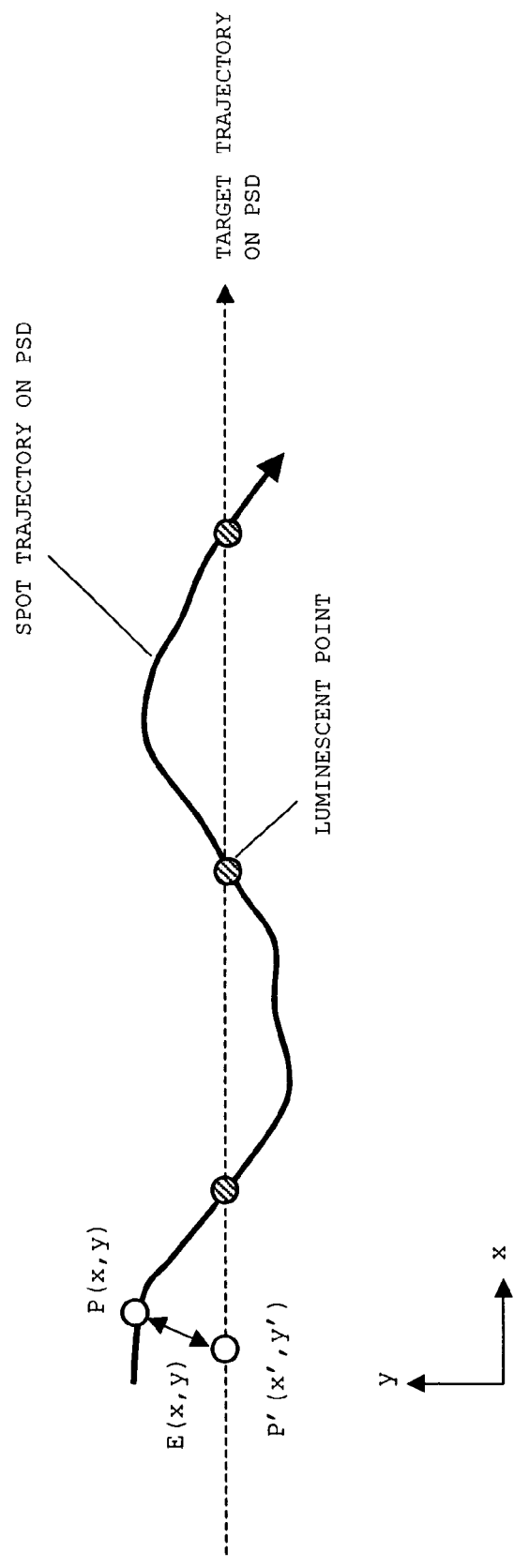
FIG. 15 is an explanatory view showing a method of applying trajectory servo according to the second embodiment of the present invention.

Note that FIG. 9 is the processing flowchart for the case where the irradiation pattern is changed based on variations in steering direction and driving speed. Here, when the irradiation pattern is changed based only on a variation in steering direction, Steps S15 and S16 in FIG. 15 are omitted. When the irradiation pattern is changed based only on a variation in driving speed, Steps S13 and S14 in FIG. 15 are omitted.

According to the flowchart shown in FIG. 9, it is possible to instantaneously detect whether or not the obstacle exists in the steering direction at the time of left or light turn. In addition, it is possible to instantaneously detect whether or not the obstacle exists at the distant position in the driving direction during the high-speed driving.

As described above, according to the first embodiment of the present invention, the laser beams are irradiated at an appropriate position and at an appropriate frequency, thus correct obstacle detection is realized.

Second Embodiment

A beam irradiation device according to a second embodiment of the present invention detects difference between a target position and an irradiation position of laser beam by monitoring the laser beam emitted from the semiconductor laser to correct scan trajectory of the laser beams based on the detection result.

Figure 10:
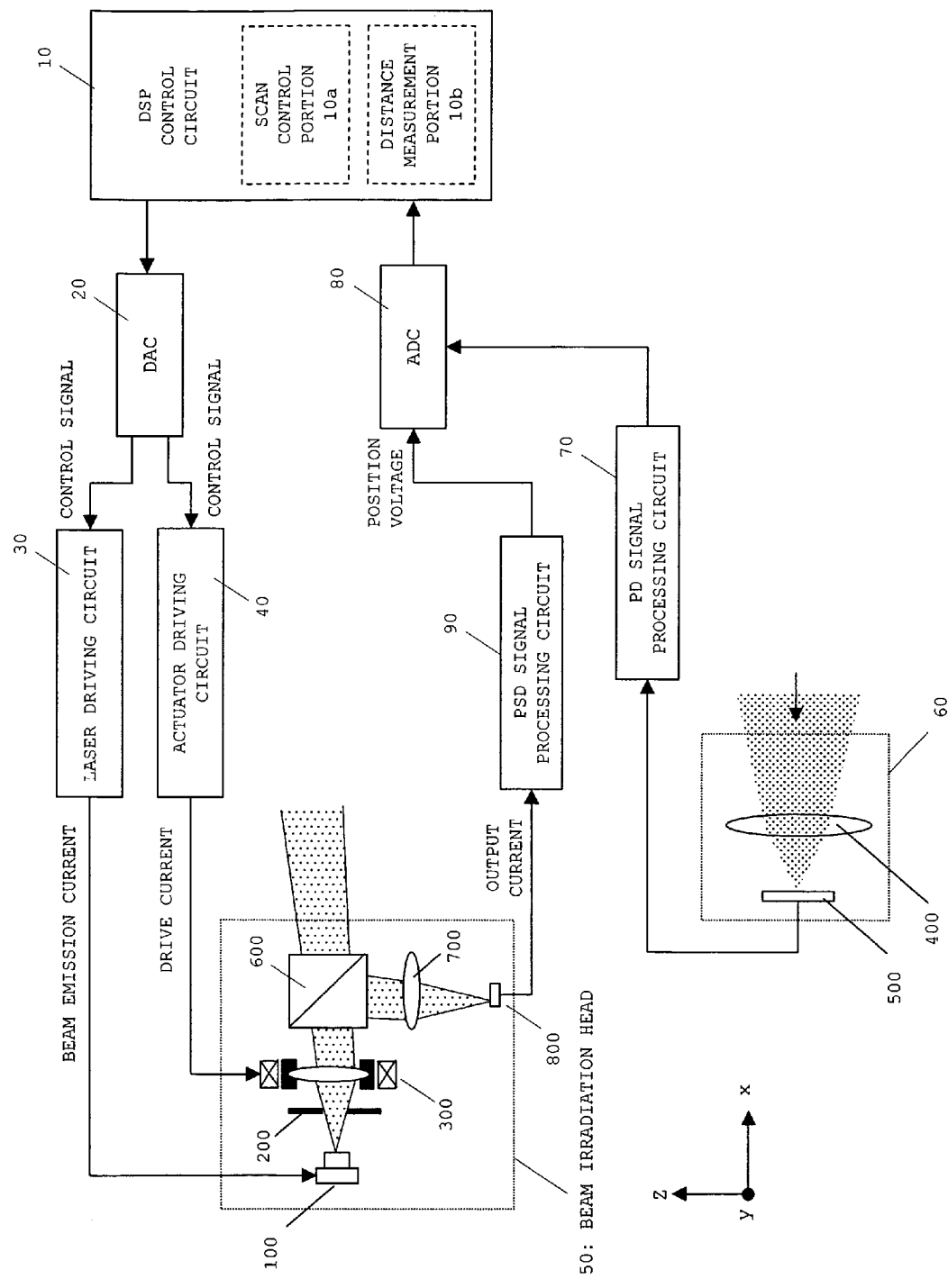
FIG. 10 shows a configuration of a beam irradiation device according to a second embodiment of the present invention.

FIG. 10 shows the configuration of the beam irradiation device. As shown in FIG. 10, the beam irradiation device is provided with a position sensitive detector (PSD) signal processing circuit 90 in addition to the configuration of the first embodiment. Also, the beam irradiation head according to the second embodiment is provided with a beam splitter 600, a converging lens 700 and a PSD 800 in addition to the configuration of the beam irradiation head of the first embodiment.

Explanation relating to the same configuration as the first embodiment will be omitted and explanation will be made relating to the configuration to differ from the first embodiment hereinafter.

A part of the laser beams that have passed through the irradiation lens is reflected by the beam splitter 600 and separated from radiated laser beams (laser beams radiated onto the target region). The separated laser beams (separated beams) are converged onto the PSD 800 through the converging lens 700. The PSD 800 has a beam receiving face parallel to an x-y plane of FIG. 10 and outputs a current corresponding to a convergence position of the separated beams on the beam receiving face. The convergence position of the separated beams on the beam receiving face and the irradiation position of the radiated laser beams on the target region correspond to each other on one-to-one basis. Therefore, the current outputted from the PSD 800 corresponds to the irradiation position of the radiated laser beams on the target region. The construction and current outputting operation of the PSD 800 will be described later in detail with reference to FIGS. 11 and 12.

An output current from the PSD 800 is inputted to the PSD signal processing circuit 90. Based on the inputted current, the PSD signal processing circuit 90 outputs a voltage signal indicating a convergence position of the separated beams to the ADC 80. The ADC 80 converts the inputted voltage signal into a digital signal and outputs the converted signal to the DSP control circuit 10. The converted signal is inputted to the scan control portion 10a provided in the DSP control circuit 10. Based on the inputted voltage signal, the scan control portion 10a detects a convergence position of the separated beams on the beam receiving face.

Disposed in the DSP control circuit 10 are a table (scan table) for scanning the irradiation position of laser beams within the target region and a table (trajectory table) indicating a trajectory of the convergence position of separated beams on the beam receiving face when the laser beams are scanned according to the scan table.

In performing a laser beam scan operation, the scan control portion 10a in the DSP control circuit 10 outputs a signal for controlling the actuator driving circuit 40 to the DAC 20 while referring to the scan table.

At the same time, the scan control portion 10a detects a convergence position of separated beams on the beam receiving face based on a signal inputted from the ADC 80, compares the detected position with a desired convergence position prescribed in the trajectory table, and outputs a signal for controlling the actuator driving circuit 40 to the DAC 20 such that the detected position is drawn to the desired convergence position. Due to this servo operation, the radiated laser beams perform a scan within the target region in such a manner as to follow the trajectory prescribed in the scan table. The servo operation will be described later in detail with reference to FIG. 15.

Furthermore, the scan control portion 10a in the DSP control circuit 10 outputs a signal for controlling the laser driving circuit 40 to the DAC 20 while referring with the irradiation pattern. The signal is input in the laser driving circuit 30 through DAC 20. The laser driving circuit 30 drives the semiconductor laser 100 such that the laser beams are emitted in pulse shape (a rectangle) at the position prescribed by the irradiation pattern (table) on the trajectory prescribed in the scan table. Here, "pulse shape" means that output of the semiconductor laser 100 is made a high level from a low level (≠0) during a fixed period of time. In this way, the laser beams are emitted at the position prescribed by the irradiation pattern (table) on the trajectory prescribed in the scan table.

Note that, in the second embodiment, the laser beams is emitted in the low level in the period other than the laser beams being to be high-level in pulse shape. The reason is to control the scan operation such that the laser beams follow along the scan trajectory during the laser beams being emitted in low level.

Figure 13:
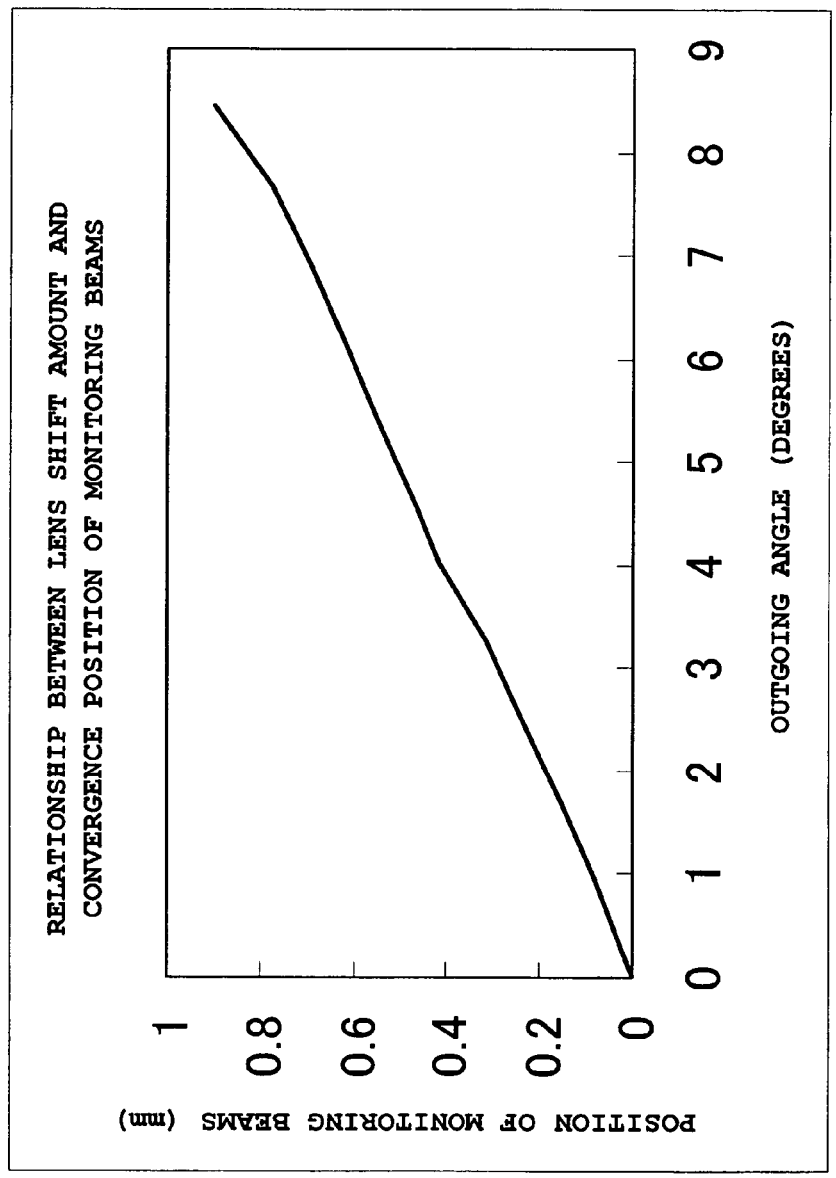
FIG. 13 shows a relationship between an outgoing angle of irradiated laser beams and a convergence position of separated beams according to the second embodiment of the present invention.

FIG. 13 shows a relationship (simulation) between an outgoing angle of radiated laser beams and a convergence position of separated beams (referred to as monitoring beams of FIG. 13) on the beam receiving face of the PSD 800 at the time when the lens actuator 300 is driven to displace the irradiation lens 301 in one direction. As shown in FIG. 13, the displacement amount of the separated beams increases in proportion to the outgoing angle of the radiated laser beams. The characteristic shown in FIG. 13 is undulated because aberration is caused in the separated beams on the beam receiving face of the PSD 800 by two-dimensionally driving the irradiation lens 301.

Figure 11:
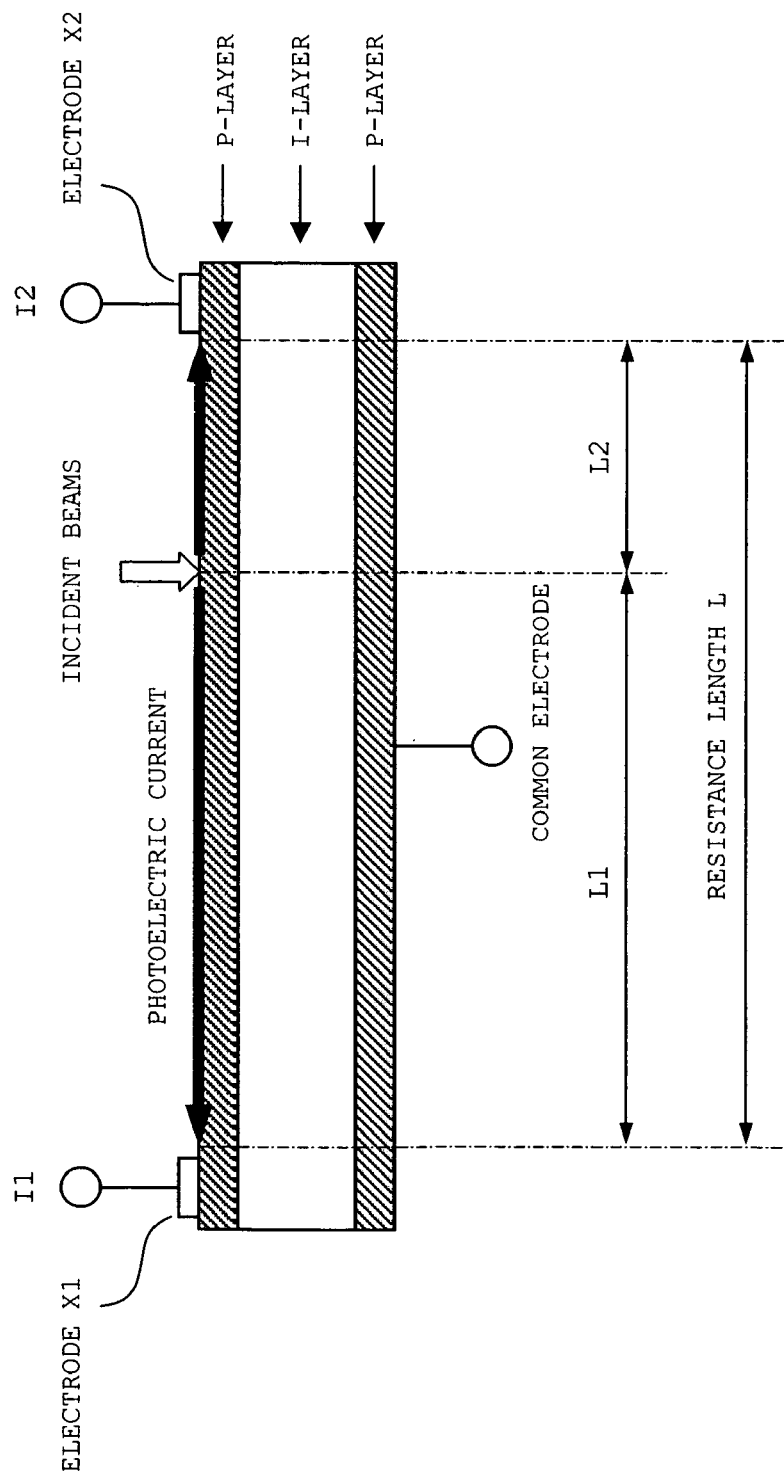
FIG. 11 shows a structure of a PSD according to the second embodiment of the present invention.

FIG. 11 shows the structure of the PSD 800. Referring to FIG. 11, the structure of the PSD 800 is illustrated when viewed in a y-axis direction of FIG. 10.

As shown in FIG. 11, the PSD 800 is structured such that a P-type resistance layer serving as both a beam receiving face and a resistance layer is formed on the surface of an N-type high-resistance silicon substrate. Electrodes X1 and X2 for outputting a photoelectric current in an x-axis direction of FIG. 10 and electrodes Y1 and Y2 (not shown in FIG. 11) for outputting a photoelectric current in the y-axis direction of FIG. 10 are formed on the surface of the resistance layer. A common electrode is formed on a reverse face side of the resistance layer.

When separated beams are converged on the beam receiving face, an electric charge proportional to the amount of beams is generated on a convergence position. This electric charge reaches the resistance layer as a photoelectric current, which is divided into currents inversely proportional to the distances to the respective electrodes X1, X2, Y1, and Y2. Those currents are then outputted therefrom, respectively. The currents outputted from the electrodes X1, X2, Y1, and Y2 have magnitudes that are determined inversely proportional to the distances from the convergence position of the separated beams to the respective electrodes X1, X2, Y1, and Y2. Thus, the convergence position on the beam receiving face can be detected based on values of the currents outputted from the electrodes X1, X2, Y1, and Y2.

Figure 12B:
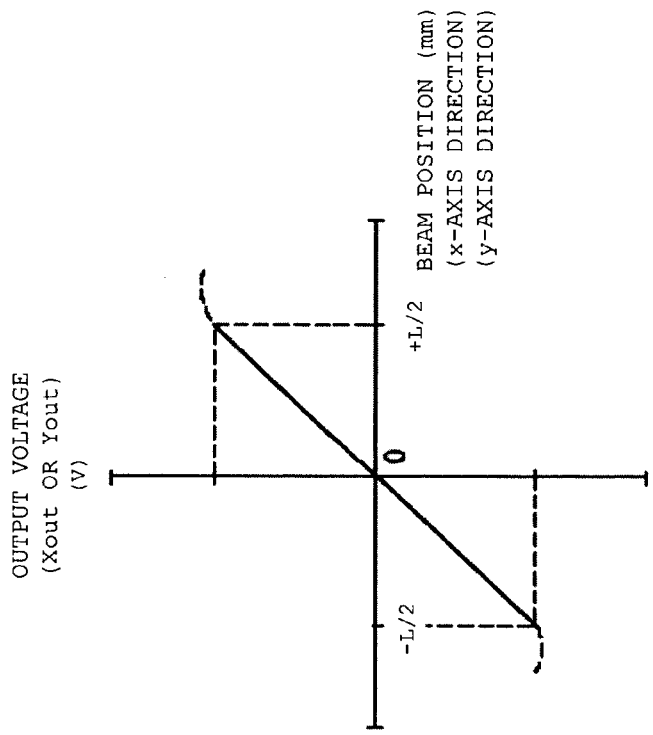
FIGS. 12B is an explanatory view showing a variation in position detecting voltage detected by PSD according to the second embodiment of the present invention.
Figure 12A:
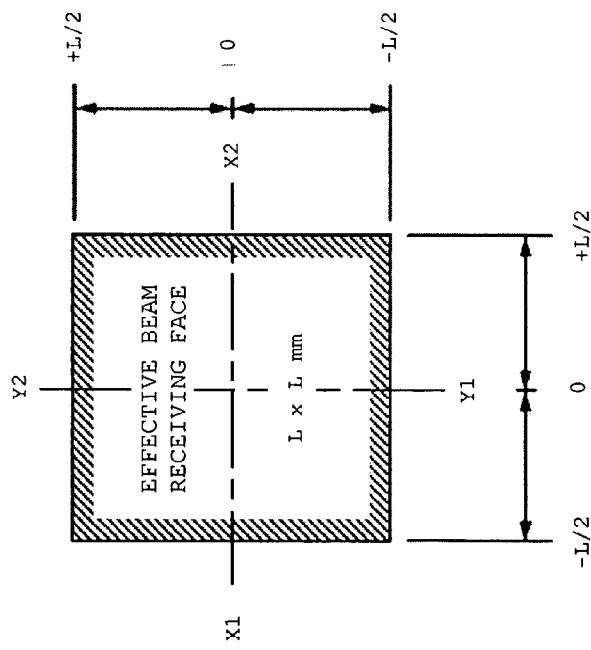
FIGS. 12A is an explanatory view showing the structure of the PSD according to the second embodiment of the present invention.

FIG. 12A is a view showing an effective beam receiving face of the PSD 800. FIG. 12B is a view showing a relationship between position detecting voltages generated in the PSD signal processing circuit 90 based on the currents outputted from the electrodes X1, X2, Y1, and Y2 and the convergence position of the separated beams on the effective beam receiving face. Referring to FIG. 12A, the effective beam receiving face is square. Given that a center position of the effective beam receiving face is a reference position (0 position), FIG. 12B shows a relationship between displacement amounts of the convergence position in the x-axis direction and the y-axis direction with respect to the reference position and an output voltage.

Based on the currents outputted from the electrodes X1, X2, Y1, and Y2, the PSD signal processing circuit 90 generates a voltage Xout corresponding to a displacement amount of the convergence position in the x-axis direction and a voltage Yout corresponding to a displacement amount of the convergence position in the y-axis direction, and outputs the voltage Xout and voltage Yout to the DSP control circuit 10 via the ADC 80. The DSP control circuit 10 detects the displacement amounts of the convergence position in the x-axis direction and the y-axis direction from the inputted voltages Xout and Yout, respectively.

A scan operation in this embodiment will be described with reference to FIGS. 14A, 14B, and 14C.

As shown in FIG. 14A, radiated laser beams are scanned so as to sequentially irradiate matrices into which the target region set in the space in front of the beam irradiation device is divided. The sequence in which the matrices are scanned can be set arbitrarily. For example, as shown in FIG. 14B, a setting can also be made such that the matrices are sequentially scanned line by line starting from the one at the upper-left corner position. As described above, a scan trajectory (scan sequence) is prescribed in the scan table of the DSP control circuit 10.

The convergence position of separated beams on the beam receiving face of the PSD 800 moves along a trajectory shown in FIG. 14C when a scan is performed as shown in FIG. 14B. The trajectory of FIG. 14C corresponds to the scan trajectory of FIG. 14B on one-to-one basis. Accordingly, the scan position of radiated laser beams can be identified from the convergence position on the trajectory of FIG. 14C. In this case, as described above, the trajectory of FIG. 14C complies with the trajectory table in the DSP control circuit 10.

In the beam irradiation device, it is most ideal that radiated laser beams are scanned along the scan trajectory shown in FIG. 14B. However, since the beam irradiation device usually undergoes undesired vibrations, disturbances, and the like, the scan position of the radiated laser beams deviates from a desired scan trajectory. In this case, the convergence position of the separated beams on the beam receiving face also deviates from the trajectory shown in FIG. 14C in accordance with the deviation of the scan position.

FIG. 15 shows an example of a spot trajectory of separated beams on the effective beam receiving face. In this case, as described above, the DSP control circuit 10 supplies a servo signal to the actuator driving circuit 40 so that the convergence position of the separated beams is drawn to the target trajectory.

It is now assumed that the convergence position of separated beams is P(x, y) and that the convergence position to be located on the target trajectory is P'(x', y') at this moment. The convergence position P'(x', y') on the target trajectory is acquired from the trajectory table set in the DSP control circuit 10. More specifically, the convergence position corresponding to the scan position of radiated laser beams is acquired from the trajectory table.

In this case, the DSP control circuit 10 calculates Ex=x−x' and Ey=y−y' based on P(x, y) and P'(x', y') and supplies a servo signal to the actuator driving circuit 40 based on a calculation result such that both Ex and Ey become equal to 0. Thus, the scan position of radiated laser beams is drawn back toward a scan position to be located on the scan trajectory at this moment. In response to this, the convergence position of separated beams is also drawn toward the convergence position P'(x', y') to be located on the target trajectory at this timing. Due to this servo operation, the radiated laser beams are scanned so as to follow the desired scan trajectory.

In the second embodiment, scan operation to the target region is performed same as the first embodiment. That is, in the second embodiment, the irradiation pattern shown in FIGS. 6A to 6E, FIGS. 7A to 7D and FIGS. 8A to 8C, and the flowchart shown in FIG. 9 may be used in scan operation of the laser beams.

However, the irradiation pattern shown in FIGS. 6A to 6E, FIGS. 7A to 7D and FIGS. 8A to 8C is to be an irradiation pattern in case where five steps of horizontal scan lines are adopted, and is not one for scan pattern having ten step of horizontal scan lines as shown in FIGS. 14A and 14B. Therefore, when the irradiation pattern shown in FIGS. 6A to 6E, FIGS. 7A to 7D and FIGS. 8A to 8C is applied to the scan pattern according to the second embodiment shown in FIGS. 14A and 14B, it is needed to prepare an appropriate irradiation pattern from these irradiation pattern according to the difference of the number of the steps of horizontal scan lines, that is, two times of irradiation patterns for one line of these irradiation pattern is repeated continually, for example.

As described above, according to the second embodiment of the present invention, same as the first embodiment above, the laser beams are irradiated at an appropriate position and at an appropriate frequency, thus correct obstacle detection is realized. Further, according to the second embodiment of the present invention, it is possible to smoothly draw the scan position of radiated laser beams back to the desired scan trajectory even when the scan position has deviated therefrom. Accordingly, a stable scan operation can be realized even when the beam irradiation device undergoes undesired vibrations or disturbances.

The embodiment of the present invention is explained above. It goes without saying that the present invention is not limited to the aforementioned embodiment but may be subject to a variety of other modifications.

For instance, although servo is applied such that the convergence position P(x, y) of separated beams is drawn toward the convergence position P'(x', y') to be located on the target trajectory at the above-mentioned timing in the second embodiment as described with reference to FIG. 15, the convergence position of separated beams can also be drawn onto the target trajectory through other servo processings.

Figure 16:
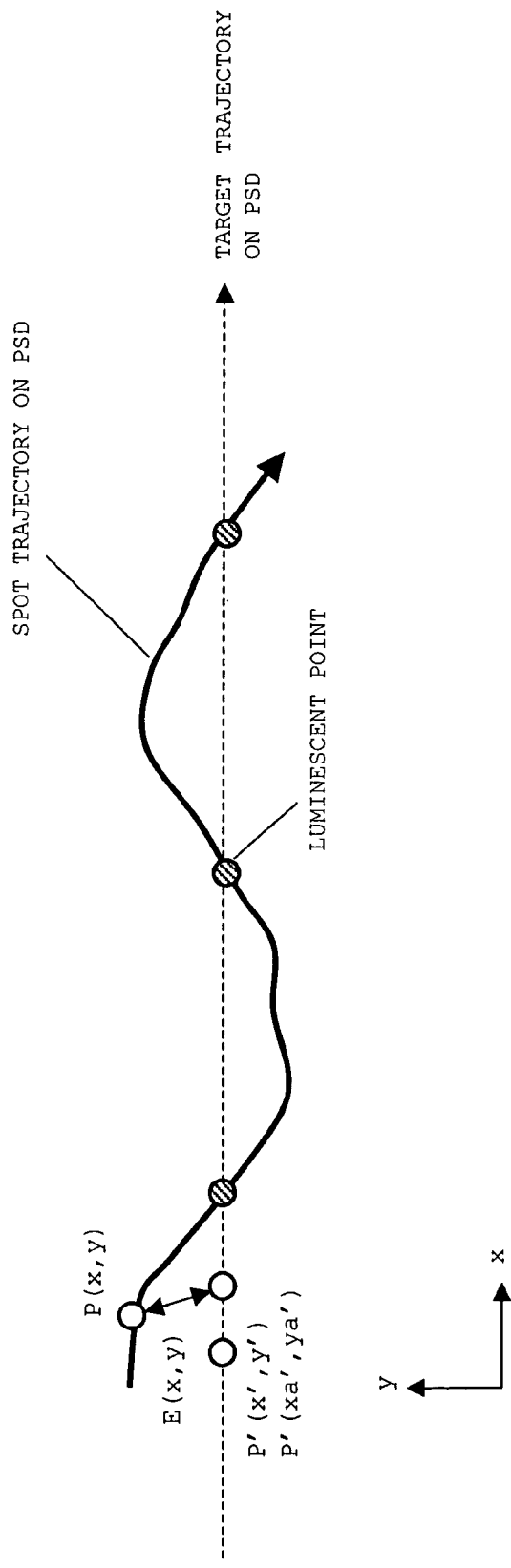
FIG. 16 is an explanatory view showing a modified method of applying trajectory servo according to the second embodiment of the present invention.

For example, as shown in FIG. 16, the convergence position of separated beams can also be drawn toward a convergence position P'(xa', ya') to be located on the target trajectory after the lapse of ΔT from the above-mentioned timing. In this case, the DSP control circuit 10 calculates Ex=x−xa' and Ey=y−ya' based on P(x, y) and P'(xa', ya') and supplies a servo signal to the actuator driving circuit 40 based on a result of the calculation such that both Ex and Ey become equal to 0. In this manner, the scan position of radiated laser beams can be smoothly drawn toward a subsequently scheduled scan position. As a result, an efficient scan operation can be realized.

In the foregoing description, the scan position of radiated laser beams may sharply deviate from a desired scan position as a result of servo deviation when the beam irradiation device undergoes vibrations or disturbances of an inconceivable magnitude. In such cases, for example, in the scan mode shown in FIGS. 4B and 14B, it is appropriate to return the scan position to the head position of a line that is being scanned at the time of the occurrence of servo deviation and to continue to perform the succeeding scan processings from that position.

If a so-called disturbance observer for predicting vibrations and disturbances is employed as well, the trajectory of radiated laser beams can be followed more smoothly. In this case, the occurrence of servo deviation can be effectively suppressed even when the beam irradiation device undergoes vibrations or disturbances of an inconceivable magnitude.

From a general concept of the present invention, a detection device in which laser beams are irradiated at appropriate position and at appropriate frequency when an obstacle is detected and, by that, obstacle detection can be performed more precisely is pulled up.

Figure 17A:
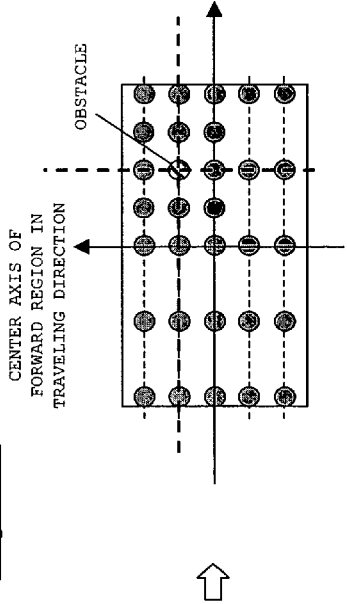
FIGS. 17A to 17C show examples of a irradiation pattern at the time of detection of an obstacle according to the second embodiment of the present invention.
Figure 17B:
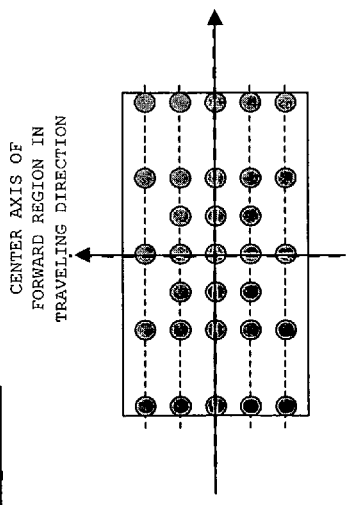
Figure 17C:
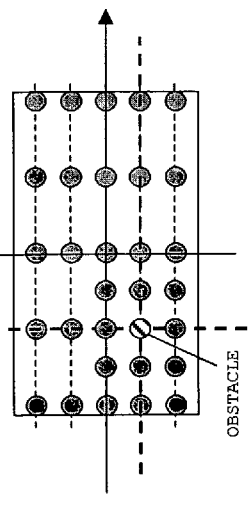

FIGS. 17A to 17C show the changes of irradiation patterns at the time when an obstacle is detected. These irradiation patterns are preferably used at the time when an obstacle is detected. As described above, these irradiation patterns are held in the DSP control circuit 10 as the table for setting the irradiation position (emitting position) of laser beams on the scan trajectory when the laser beams are scanned within the target region according to the scan table.

When the obstacle is detected within the target region during normal driving using a scan pattern as shown in FIG. 17A, an origin position of the irradiation pattern is changed to the obstacle detection position as shown in FIG. 17B or 17C. In response to this, the scan trajectory of the target region is changed as shown in FIG. 17B or 17C. When the irradiation patter is changed like this, the irradiation frequency in the vicinity of the obstacle position increases, so that, for example, a variation in position of the obstacle can be smoothly detected. In this case, the irradiation pattern shown in FIG. 17A is held in the DSP control circuit 10. The scan control portion 10a executes calculation processing for changing the scan origin on the held scan pattern to the obstacle detection position and resetting the scan trajectory.

Figure 18:
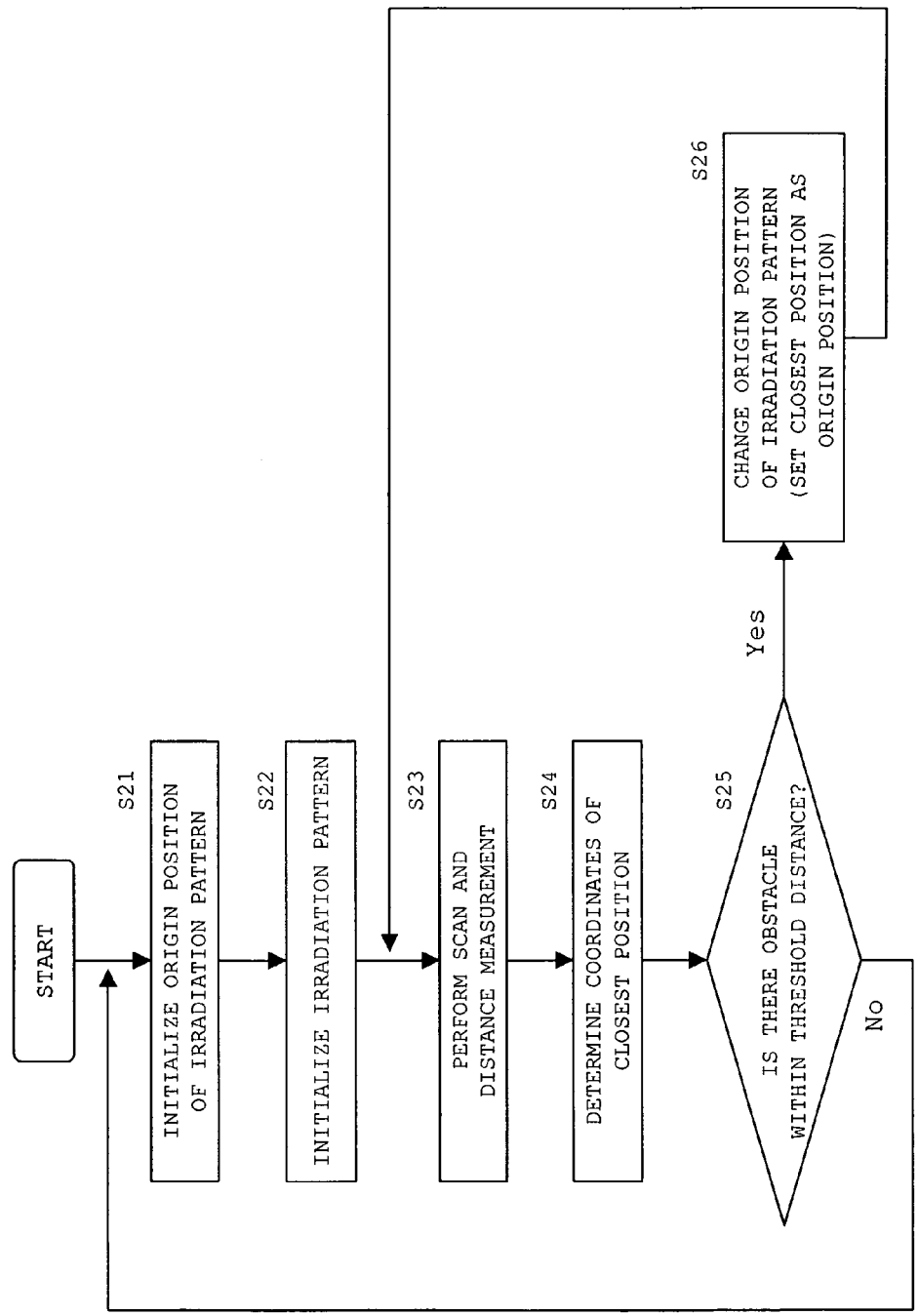
FIG. 18 is a flowchart showing a flow of irradiation pattern changing processing when the obstacle is detected according to the second embodiment of the present invention.

FIG. 18 is a processing flowchart for the case where the irradiation pattern is changed in response to the detection of the obstacle.

When the scan operation starts, the origin position of the irradiation pattern is set as the center position of the target region (Step S21). In addition, the irradiation pattern to be applied for the normal driving is set as the pattern for the scan operation (Step S22). Then, the irradiation pattern is fit to the target region to set the scan trajectory for the scan operation. Scan with laser beams is performed along the scan trajectory. Obstacle detection processing and processing for detecting a distance from the vehicle to the obstacle are performed at each scan position based on a state of reflection beams during the scan (Step S23).

When the obstacle is detected within the target region in the processings, a scan position (coordinate position within the target region) where the obstacle is closest to the vehicle is determined based on distances between the obstacle and the vehicle in respective scan positions (Step S24). Then, whether or not a distance between the obstacle and the vehicle in the closest scan position is shorter than a threshold distance is determined (Step S25). When the distance is shorter than the threshold distance (Step S25: Yes), the closest scan position is set as the origin position of the target region and an irradiation pattern according to the origin position corresponding to the closest scan position is calculated (Step S26). At a next scan timing, the scan with laser beams is formed while applying the calculated irradiation pattern. Obstacle detection processing and distance measurement processing to the obstacle are performed at each scan position (Step S23).

The resetting of the irradiation pattern and the scan operation based thereon are repeated until the obstacle is not detected within the target region or the distance between the obstacle and vehicle in the closest scan position is larger than the threshold distance (Step S25: Yes→Step S26). When the determination in Step S25 becomes No, processing returns to Step S21. Then, the scan origin position and the scan pattern are initialized (Steps S21 and S22) and obstacle detection and distance measurement are performed based thereon (Step S23).

According to the flowchart shown in FIG. 18, the scan frequency in the vicinity of the obstacle position increases based on the detection of the obstacle, so that, for example, a variation in position of the obstacle can be smoothly detected.

The embodiment of the present invention can be variously modified as appropriate without departing from the scope of technical idea described in the claims.

What is claimed is:

1. A detection device for a vehicle, for detecting an obstacle within a target region by emitting a laser beam to the target region, comprising:
   a) a beam source for emitting a laser beam in pulse shape;
   b) an actuator for changing an irradiation direction of the laser beam;
   c) a target region setting circuit for setting the target region within which the laser beam is scanned;
   d) a scan trajectory setting circuit for setting a scan trajectory;
   e) an irradiation pattern setting circuit for setting an irradiation pattern of irradiation positions irradiated by the laser beam,
   wherein the target region, the scan trajectory, and the irradiation pattern are determined based upon at least one of the following factors: a speed of the vehicle, a direction of the vehicle, and a steering of the vehicle,
   the irradiation pattern determines the irradiation positions of the laser beam in pulse shape on the scan trajectory; and
   frequency of the irradiation positions in the target region is weighted partially high in a portion of the target region where an object is detected.

* * * * *